United States Patent
Yu et al.

(10) Patent No.: US 12,448,632 B2
(45) Date of Patent: Oct. 21, 2025

(54) GUANIDINE DEGRADATION ENZYME AND METHODS OF USE

(71) Applicants: Alliance for Sustainable Energy, LLC, Golden, CO (US); Vanderbilt University, Nashville, TN (US)

(72) Inventors: Jianping Yu, Golden, CO (US); Bo Wang, Nashville, TN (US)

(73) Assignees: Alliance for Sustainable Energy, LLC, Golden, CO (US); Vanderbilt University, Nashville, TN (US)

( * ) Notice: Subject to any disclaimer, the term of this patent is extended or adjusted under 35 U.S.C. 154(b) by 35 days.

(21) Appl. No.: 17/555,350

(22) Filed: Dec. 17, 2021

(65) Prior Publication Data
US 2022/0204998 A1    Jun. 30, 2022

Related U.S. Application Data

(60) Provisional application No. 63/126,828, filed on Dec. 17, 2020.

(51) Int. Cl.
| | |
|---|---|
| *C12N 1/00* | (2006.01) |
| *C12N 1/20* | (2006.01) |
| *C12N 15/52* | (2006.01) |
| *C12P 7/06* | (2006.01) |
| *C12R 1/01* | (2006.01) |

(52) U.S. Cl.
CPC .............. *C12P 7/065* (2013.01); *C12N 1/205* (2021.05); *C12N 15/52* (2013.01); *C12R 2001/01* (2021.05)

(58) Field of Classification Search
CPC .. C07K 14/195; C12N 15/74; C12N 15/8253; C12N 15/8243; Y02E 50/10; C12P 13/001; C12P 13/12; C12P 5/026
USPC ..................................................... 435/252.3
See application file for complete search history.

(56) References Cited

PUBLICATIONS

Kisselev L., (Structure, 2002, vol. 10: 8-9).*
Kwiatkowski et al., (Biochemistry 38:11643-11650, 1999.*
Wristlock et al., (Quarterly Reviews of Biophysics 2003, vol. 36 (3): 307-340.*
Proteins: Structure, Function and Genetics, 2000, vol. 41: 98-107.*
Durall et al., "Increased ethylene production by overexpressing phosphoenolpyruvate carboxylase in the cyanobacterium Synechocystis PCC 6803", Biotechnology for Biofuels and Bioproducts, 2020, vol. 13, No. 16, pp. 1-13.
Eckert et al., "Ethylene-forming enzyme and bioethylene production", Biotechnology for Biofuels and Bioproducts, 2014, vol. 7, No. 33, pp. 1-11.
Holland et al., "Impacts of genetically engineered alterations in carbon sink pathways on photosynthetic performance", Algal Research, 2016, vol. 20, pp. 87-99.
Kermani et al., "Guanidinium export is the primal function of SMR family transporters", PNAS, Mar. 20, 2018, vol. 115, No. 12, pp. 3060-3065.
Moreno et al., "Outdoor cultivation of a nitrogen-fixing marine cyanobacterium, *Anabaena* sp. ATCC 33047", Biomolecular Engineering, Jul. 2003, vol. 20, Nos. 4-6, pp. 191-197.
Takahama et al., "Construction and analysis of a recombinant cyanobacterium expressing a chromosomally inserted gene for an ethylene-forming enzyme at the psbAI locus", Journal of Bioscience and Bioengineering, 2003, vol. 95, No. 3, pp. 302-305.
Ungerer et al., "Sustained photosynthetic conversion of CO2 to ethylene in recombinantcyanobacterium Synechocystis 6803", Energy & Environmental Science, 2012, vol. 5, pp. 8998-9006.
Wang et al.,"A Genetic Toolbox for Modulating the Expression of Heterologous Genes in the *Cyanobacterium synechocystis* sp. PCC 6803", ACS Synth Bio,I 2018, vol. 7, No. 1, pp. 276-286.
Wang et al., "Photosynthetic production of the nitrogen-rich compound guanidine", Green Chemistry, 2019, vol. 21, No. 11, pp. 2928-2937.
Wang et al., "A guanidine-degrading enzyme controls genomic stability of ethylene-producing cyanobacteria", Nature Communications, 2021, vol. 12, No. 5150, pp. 1-13.
Xiong et al., "The plasticity of cyanobacterial carbon metabolism", Current Opinion in Chemical Biology, 2017, vol. 41, pp. 12-19.

* cited by examiner

*Primary Examiner* — Tekchand Saidha
*Assistant Examiner* — Mohammad Y Meah
(74) *Attorney, Agent, or Firm* — Sam J. Barkley

(57) ABSTRACT

Presented herein are *Synechococcus* strains engineered to express the bacterial ethylene-forming enzyme (EFE) that exhibit unstable ethylene production due to toxicity and genomic instability induced by accumulation of the EFE-byproduct guanidine. Co-expression of EFE and Sll1077 significantly enhanced genomic stability and enabled the resulting *Synechococcus* strain GD-EFE7942 to achieve sustained high-level ethylene production. The engineered strains and methods disclosed herein are useful for guanidine degradation pathways and for ethylene bioproduction in cyanobacteria.

7 Claims, 13 Drawing Sheets
Specification includes a Sequence Listing.

GUANIDINE DEGRADATION ENZYME AND METHODS OF USE

CROSS-REFERENCE TO RELATED APPLICATIONS

This application claims priority under 35 U.S.C. § 119 to U.S. provisional patent application No. 63/126,828 filed on Dec. 17, 2020, the contents of which are hereby incorporated in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

SEQUENCE LISTING

The instant application contains a Sequence Listing which has been submitted via EFS-web and is hereby incorporated by reference in its entirety. The ASCII copy as filed herewith was originally created on Mar. 18, 2022. The ASCII copy as filed herewith is named NREL 20-128_ST25.txt, is 8 kilobytes in size and is submitted with the instant application.

BACKGROUND

Guanidine is a natural metabolite present in bacteria and human bodies. It is unknown to us whether its accumulation or deficiency may cause health issues. In agriculture/aquaculture, guanidine is a potential slow-release nitrogen fertilizer that could help increase fertilizer utilization efficiency and reduce fertilizer run-off. In biotechnology, guanidine is a co-product with ethylene from the ethylene-forming enzyme reaction. In environmental remediation, guanidine is a soil contaminant at military sites.

Despite the practical applications of guanidine as a protein denaturant (when applied at high concentrations) and as an ingredient in slow-release fertilizers, little is known about the fate of guanidine in biological systems. Guanidine has been detected in human urine at concentrations of 7-13 mg $L^{-1}$ (0.12-0.22 mM), but its biosynthetic pathway remains elusive. A recent study also revealed that a variety of microorganisms, including *E. coli*, produce guanidine through unknown mechanisms under nutrient-poor growth conditions, suggesting that guanidine metabolism is biologically significant and is prevalent in natural environments.

While nonenzymatic decomposition of guanidine under physiological conditions is extremely slow, soil microbes are able to degrade guanidine using heretofore unknown metabolic pathways.

To date, the only known enzyme that produces guanidine is the ethylene-forming enzyme (EFE) that catalyzes formation of ethylene and guanidine simultaneously from α-ketoglutarate (AKG) and arginine. Due to biotechnological interests in developing an alternative pathway for renewable production of ethylene, which is the most highly produced organic compound in the petro-chemical industry, the efe gene from *Pseudomonas syringae* (a plant pathogen) has been introduced into several model cyanobacterial species. Some hosts, e.g., *Synechocystis* sp. PCC 6803 (hereafter *Synechocystis* 6803), have been able to accommodate stable, high-level expression of EFE and thereby sustain enhanced production of ethylene directly from sunlight and $CO_2$. Other cyanobacterial species, such as *Synechococcus elongatus* PCC 7942 (hereafter *Synechococcus* 7942) and *Synechococcus elongatus* PCC 11801 (hereafter *Synechococcus* 11801), however, have not been able to tolerate high-level expression of EFE, and the recombinant strains suffered severe growth inhibition that was rescued by spontaneous chromosomal mutations that abolished the expression of functional EFE.

SUMMARY

In an aspect, disclosed herein are *Synechococcus* strains engineered to express the bacterial ethylene-forming enzyme (EFE) exhibit unstable ethylene production due to toxicity and genomic instability induced by accumulation of the EFE-byproduct guanidine. Co-expression of EFE and Sll1077 significantly enhanced genomic stability and enabled the resulting *Synechococcus* strain GD-EFE7942 to achieve sustained high-level ethylene production. The engineered strains and methods disclosed herein are useful for guanidine degradation pathways and for ethylene bioproduction in cyanobacteria.

In an aspect, disclosed herein is a non-naturally occurring cyanobacterial strain engineered to express a heterologous bacterial ethylene-forming enzyme (EFE) and a guanidine degradation enzyme. In an embodiment, the guanidine degradation enzyme is encoded by Sll1077. In an embodiment, the non-naturally occurring cyanobacterial strain comprises improved cell growth in a solution containing guanidine compared to a naturally occurring cyanobacterial strain. In an embodiment, the non-naturally occurring cyanobacterial strain is selected from the group consisting of *Synechococcus* sp. and *Synechocystis* sp. In an embodiment, the non-naturally occurring cyanobacterial strain is *Synechococcus* 7942. In an embodiment, the non-naturally occurring cyanobacterial strain is *Synechococcus* EFE7942. In an embodiment, the strain is *Synechococcus* GD-EFE7942. In an embodiment, the strain is capable of ethylene production. In an embodiment, the strain is capable of guanidine degradation.

In an aspect disclosed herein is a method for guanidine degradation comprising the step of exposing the non-naturally occurring cyanobacterial strain of claim 1 to a solution containing guanidine.

In another aspect, disclosed herein is a non-naturally occurring cyanobacteria capable of fixing nitrogen and producing ammonia. In an embodiment, the non-naturally occurring cyanobacteria comprises a heterologous efe gene. In another embodiment, the non-naturally occurring cyanobacteria comprises guanidinase activity. In an embodiment, the non-naturally occurring cyanobacterial strain is an *Anabaena* sp. In an embodiment, the non-naturally occurring cyanobacteria is selected from the group consisting of *Anabaena* 7120 and *Anabaena* sp. 33047. In an embodiment, the non-naturally occurring cyanobacteria is capable of secreting guanidine. In an embodiment, the non-naturally occurring cyanobacteria is capable of producing guanidine from about 4.3 mg/L to 20 mg/L over seven days. In an embodiment, the non-naturally occurring cyanobacteria is capable of producing ammonia from about 4.3 mg/L to 20 mg/L over seven days. In an embodiment, the non-naturally occurring cyanobacteria is capable of producing urea from about 4.3 mg/L to 20 mg/L over seven days. In an embodiment, the non-naturally occurring cyanobacteria of comprises a heterologous ABC transporter substrate binding protein.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 1a, Phenotypes of *Synechocystis* 6803 and *Synechococcus* 7942 grown in nitrate-deprived medium with or without guanidine. "6803", *Synechocystis* 6803 strain grown in nitrate-deprived medium; "6803+", *Synechocystis* 6803 strain grown in nitrate-deprived medium supplemented with 5 mM guanidine. "6803K+", *Synechocystis* 6803 cells initially killed by heating at 95° C. for 10 min and then resuspended in the nitrate-deprived medium supplemented with 5 mM guanidine. FIG. 1b, Time courses of cell mass accumulation as monitored by readings of $OD_{730}$. FIG. 1c, Time courses of guanidine concentrations in the culture supernatants. Data represent means and standard deviations from three biological replicates.

FIG. 2a, depicts the metabolic role of Sll1077 in degrading guanidino compounds. FIG. 2b, depicts time courses of cell mass accumulation. FIG. 2c, depicts phenotypes of *Synechocystis* 6803 and the Δsll1077 strain (PB805W) grown in nitrate-deprived medium with or without guanidine as the nitrogen source. 5 mM guanidine was added into the nitrate-deprived medium as indicated by "+" following the strain names. FIG. 2d depicts the absorbance spectra of cultures at day 0 and day 1 as shown in b. Absorbance was normalized to the absorbance at 730 nm. FIG. 2e depicts time courses of guanidine concentrations in the culture supernatants. Data represent means and standard derivations from three biological replicates.

FIG. 3a, depicts strategies for enhancing the overexpression of gene sll1077 in *Synechocystis* 6803. Gene sll1077 was overexpressed driven by the tac promoter, with its RBS at the 5' region and the His tag and terminator at the 3' region optimized. FIG. 3a depicts SEQ ID NO: 1 (RBS for PB806W); SEQ ID NO: 2 (RBS for PB807W); SEQ ID NO: 3 (RBS for PB808W); SEQ ID NO: 4 (RBS for PB809W); SEQ ID NO: 5 (RBS for PB810W); SEQ ID NO: 6 (RBS for PB811W); SEQ ID NO: 7 (RBS for PB812W); SEQ ID NO: 8 (RBS for PB816W); SEQ ID NO: 9 (RBS for PB817W). FIG. 3b depicts SDS-PAGE and western blotting (His tag) showing the improved expression of Sll1077 in *Synechocystis*. FIG. 3c depicts guanidine degradation profiles of *Synechocystis* 6803 and sll1077-overexpressing strains.

FIG. 4a depicts an image of SDS-PAGE showing the cell extract from *Synechocystis* 6803, PB816W and purified Sll1077-His. FIG. 4b depicts the structure of a TBDMS derivative of urea. Red font indicates the urea backbone. The boxed portion indicates the main ion detected by GC-MS. FIG. 4c depicts ion counts of ion 231 for TBDMS derivative of urea standard or the product of guanidine incubated with either Sll1077-His (Reaction) or bovine serum albumin (Control). FIG. 4d depicts mass spectra of the peak at 16.095 min in FIG. 4c. FIG. 4e depicts guanidine degradation pathways identified to date. Pathway I was reported previously, and pathway II is novel.

FIG. 5a depicts cell growth curves for the *Synechococcus* 7942 and GD7942 (+sll1077) grown with various concentrations of exogenous guanidine in the nitrate-deprived culture medium. FIG. 5b depicts time courses of guanidine concentrations in the culture supernatants of *Synechococcus* 7942 and GD7942 grown with 1 mM guanidine. FIG. 5c depicts time courses of urea concentrations in the culture supernatants of *Synechococcus* 7942 and GD7942 grown with 1 mM guanidine. FIG. 5d depicts cell growth curves of *Synechococcus* 7942 grown in nitrate-replete or nitrate-deprived medium (N-free) with or without 5 mM urea under photoautotrophic conditions. Data represent means and standard derivations from three biological replicates for FIGS. 5a-c, and two biological replicates for FIG. 5d.

FIG. 6a depicts colonies of strains EFE7942 and GD-EFE7942 formed on agar plates at 30° C. DNA sequencing results revealed that for strain EFE7942, the smaller colonies indicated by cyan triangles harbored the correct EFE expression cassette, while the bigger colonies denoted by red triangles harbored mutated EFE expression cassettes; for strain GD-EFE7942, colony sizes were uniform and DNA sequencing identified no mutations around the EFE expression cassette. FIG. 6b depicts cell growth curves in liquid cultures at 30° C. Cultures were re-inoculated into fresh media every three days. FIG. 6c depicts volumetric ethylene productivities of strains EFE7942 and GD-EFE7942. FIG. 6d depicts specific ethylene productivities of strains EFE7942 and GD-EFE7942. Cultures were re-inoculated every three days. Data represent means and standard deviations from two biological replicates. FIG. 6e depicts absorbance spectra of cultures shown in FIGS. 6b-6d at day 1 and day 2. Absorbance was normalized to the absorbance at 730 nm. FIG. 6f depicts two colonies of the wild-type strain 7942, ten colonies of strain EFE7942 and ten colonies of strain GD-EFE7942 were randomly picked from plates spread with diluted day-13 cultures shown in FIGS. 6b-d and were subjected to colony PCR using primers flanking the efe-insertion site on the genome. Red arrows indicate the expected PCR product size for strains EFE7942 and GD-EFE7942; black arrows indicate the expected PCR product size for the wild-type 7942 strain. FIG. 6g depicts DNA sequencing of the PCR products obtained in f revealed mutations of the EFE expression cassettes on the genomes of all ten randomly picked EFE7942 colonies, whereas no mutations arose within the genomic region of the EFE expression cassette in any of the ten GD-EFE7942 colonies.

FIG. 7a depicts guanidine concentrations in the culture media. FIG. 7b depicts $OD_{730}$ of cell cultures three days after inoculation.

FIG. 8a depicts a schematic structure of the EFE expression cassette inserted into the genomes of *Synechococcus elongatus* strains EFE7942 and GD-EFE7942. Arrows in FIG. 8b indicate the primers used for PCR verification of genotypes of the efe-expressing strains. Red asterisks indicate sites where mutation occurred causing early termination of the translation of EFE in the randomly chosen bigger EFE7942 colonies pictured in FIGS. 6a and 6b, Colony PCR results showing the genotypes of efe-expressing cells initially grown on agar plates placed at 35° C. ("before") and then on agar plates placed at 30° C. ("after" as depicted in FIG. 6a). DNA fragments were amplified using primers illustrated as black arrows in a. Red arrow indicates the expected size of the PCR product should cells maintain the correct EFE expression cassette.

FIG. 11a depicts growth of two cyanobacterial strains. FIG. 11b depicts specific ethylene productivities. Strains were inoculated in the mBG11 medium with an initial $OD_{730}$ of about 0.05, under 120 $\mu E\ m^{-2}\ s^{-1}$, 130 rpm, 30° C., aerated with 1% $CO_2$.

DETAILED DESCRIPTION

Figures 1A, 1B, 1C:
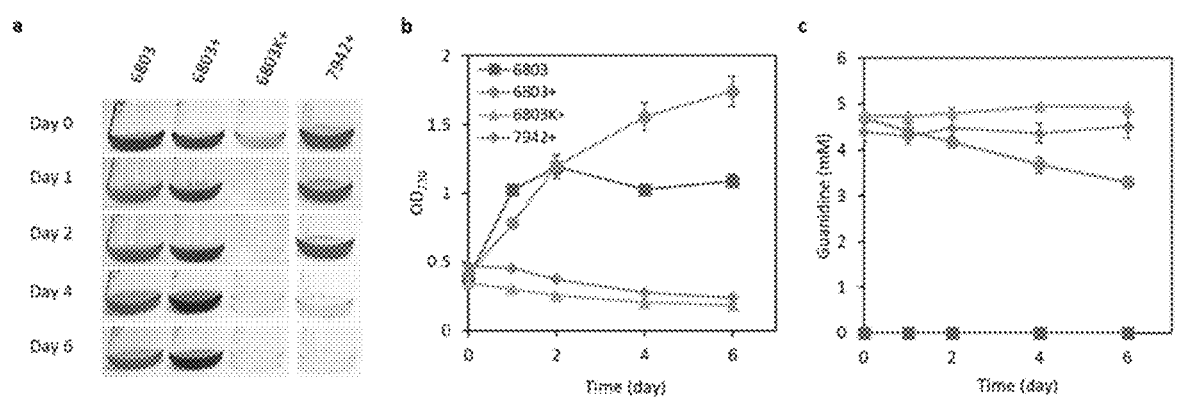
FIGS. 1a, 1b and 1c depict varied capabilities in degrading guanidine between two model cyanobacterial species.

In certain embodiments, guanidine degradation enzyme and its application in ethylene production, fertilizer utilization, medicine, and soil remediation are disclosed herein.

As disclosed herein, an enzyme from the cyanobacterium *Synechocystis* sp PCC 6803 was identified that is capable of degrading guanidine to urea and ammonia. In an embodiment, the guanidine toxicity to cyanobacterial strains was determined. This enzyme enables the cyanobacterium to grow using guanidine as the only nitrogen source. Enhanced expression of this enzyme in this cyanobacterium leads to faster guanidine degradation. Heterologous expression of this enzyme enables another cyanobacterium *Synechococcus elongatus* 7942 to degrade guanidine, and to sustain ethylene production when the ethylene forming enzyme is also expressed heterologously. Heterologous or enhanced expression of this enzyme and its derivative could be used to enhance (1) ethylene productivity, (2) fertilizer utilization efficiency, (3) guanidine removal from contaminated environment, and (4) the accumulation or degradation of guanidine in a medical or vet application via intake of a gut microbe with modification of the gene encoding this guanidine degradation enzyme. The use of this enzyme in ethylene production is described above. In fertilizer utilization efficiency improvement, when guanidine is the added fertilizer, or is produced by a nitrogen-fixing microbe, the crop or algae could be engineered to express or enhance the expression of this guanidine degrading enzyme, thus will be able to use guanidine efficiently as nitrogen fertilizer. In environmental cleanup of guanidine contamination, this enzyme may be expressed heterologously or its expression may be enhanced genetically in organisms that grow in the contaminated site to enhance guanidine degradation.

Recent studies have revealed the prevalence and biological significance of guanidine metabolism in nature. However, the metabolic pathways used by microbes to degrade guanidine or mitigate its toxicity have not been widely studied. In the process of genetically engineering cyanobacteria to produce the commercial chemical ethylene, we found that accumulation of guanidine (a byproduct of biological ethylene production) could significantly inhibit the growth of cyanobacterial cells. Through comparative proteomics and subsequent experimental validation, we identified a novel guanidine-degrading enzyme, Sll1077, in the model cyanobacterium *Synechocystis* sp. PCC 6803. Sll1077 is able to convert guanidine to urea and is the pivotal enzyme in mitigating toxic guanidine accumulation in this species. *Synechococcus elongatus* PCC 7942 lacks a homolog of sll1077 in its genome and is sensitive to guanidine.

Disclosed herein, is a novel guanidine-degrading enzyme discovered through comparative analysis of multiple cyanobacterial species. As disclosed herein, guanidine possesses significant toxicity to cyanobacterial cells and destabilizes their genome in response to recombinant EFE expression. *Synechocystis* 6803 is able to degrade and utilize guanidine as a nitrogen source through the activity of an enzyme encoded by the gene sll1077, which was previously annotated as an agmatinase/arginase. Both *Synechococcus* 7942 and *Synechococcus* 11801 lack a homologous enzyme in their genomes and are unable to mitigate guanidine toxicity. Unexpectedly, we discovered that Sll1077 is able to degrade guanidine into urea, and expression of Sll1077 in a recombinant *Synechococcus* 7942 strain confers the ability to degrade guanidine into non-toxic urea. Co-expression of Sll1077 and EFE in *Synechococcus* 7942 stabilizes the genome of the resultant strain and leads to sustained production of ethylene under photoautotrophic conditions.

Figures 7A, 7B:
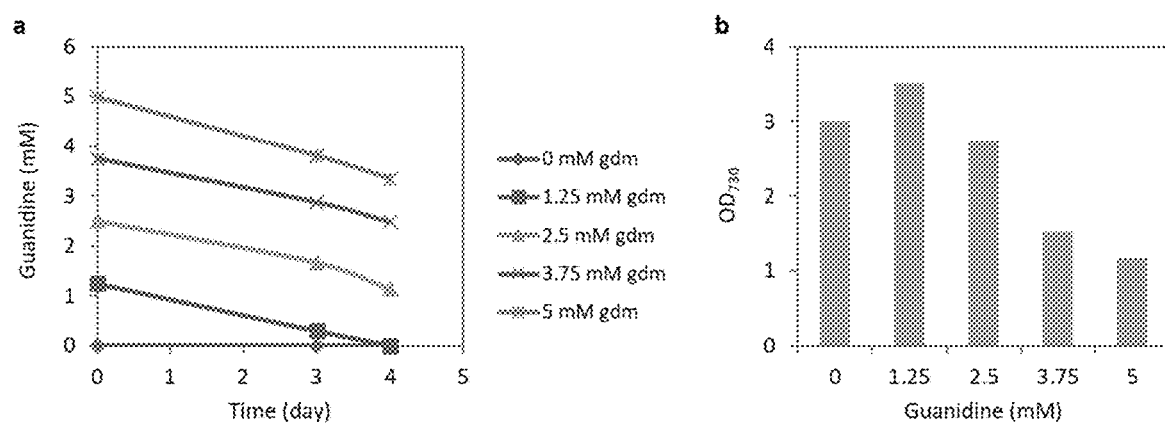
FIGS. 7a and 7b depict degradation of guanidine by *Synechocystis* culture with nitrate gradually replaced by guanidine in the medium. *Synechocystis* 6803 was inoculated with an initial $OD_{730}$ of 0.1 in the mBG11 medium with nitrate adjusted from 17.6 mM to 5 mM (0 mM gdm), and then the nitrate was gradually replaced by the equal molar concentrations of guanidine until the entire 5 mM nitrate was replaced by 5 mM guanidine (5 mM gdm).

Varied guanidine degradation capabilities are present in different cyanobacterial species. Given that the impacts of guanidine on microorganisms are unclear, we studied guanidine degradability and toxicity in two model cyanobacterial species: *Synechocystis* 6803 and *Synechococcus* 7942. In our preliminary experiments with *Synechocystis* 6803, when nitrate was gradually replaced with guanidine in the culture medium, the guanidine concentrations declined over a period of four days in all cases under photoautotrophic cultivation conditions (see FIG. 7). In order to rule out the possibility of photochemical degradation, *Synechocystis* 6803 cells were resuspended in the nitrate-deprived mBG11 medium with or without 5 mM guanidine. In parallel, *Synechococcus* 7942 and heat-killed *Synechocystis* 6803 cells were also resuspended in the nitrate-deprived culture medium supplemented with 5 mM guanidine. We found that while *Synechocystis* 6803 cells grown in nitrate-deprived medium exhibited an expected chlorosis phenotype and were still able to double the amount of biomass, cells grown in the guanidine-supplemented medium were able to maintain their green pigmentation and reached a higher cell density after 6 days of photoautotrophic cultivation (see FIGS. 1a and 1b). The Synechocystis 6803 cells exposed to exogenous guanidine had a slower growth rate than those not exposed to guanidine during the first day, probably due to the toxicity of guanidine (see FIGS. 1a and 1b). By contrast, the cultures inoculated with heat-killed Synechocystis 6803 or live Synechococcus 7942 cells did not show a typical chlorotic phenotype, and showed continuous decline of biomass over the period of 6 days (see FIGS. 1a and 1b). While the guanidine content in the culture with Synechococcus 7942 or heat-killed Synechocystis cells did not decline, the continuous increase of biomass in the culture of live Synechocystis 6803 cells coincided with a steady decrease of the guanidine concentration in the culture medium (see FIG. 1c). To this end, we hypothesized that a guanidine-degrading metabolic pathway may exist in Synechocystis 6803 but not in Synechococcus 7942.

Figures 2A, 2B, 2C, 2D, 2E:
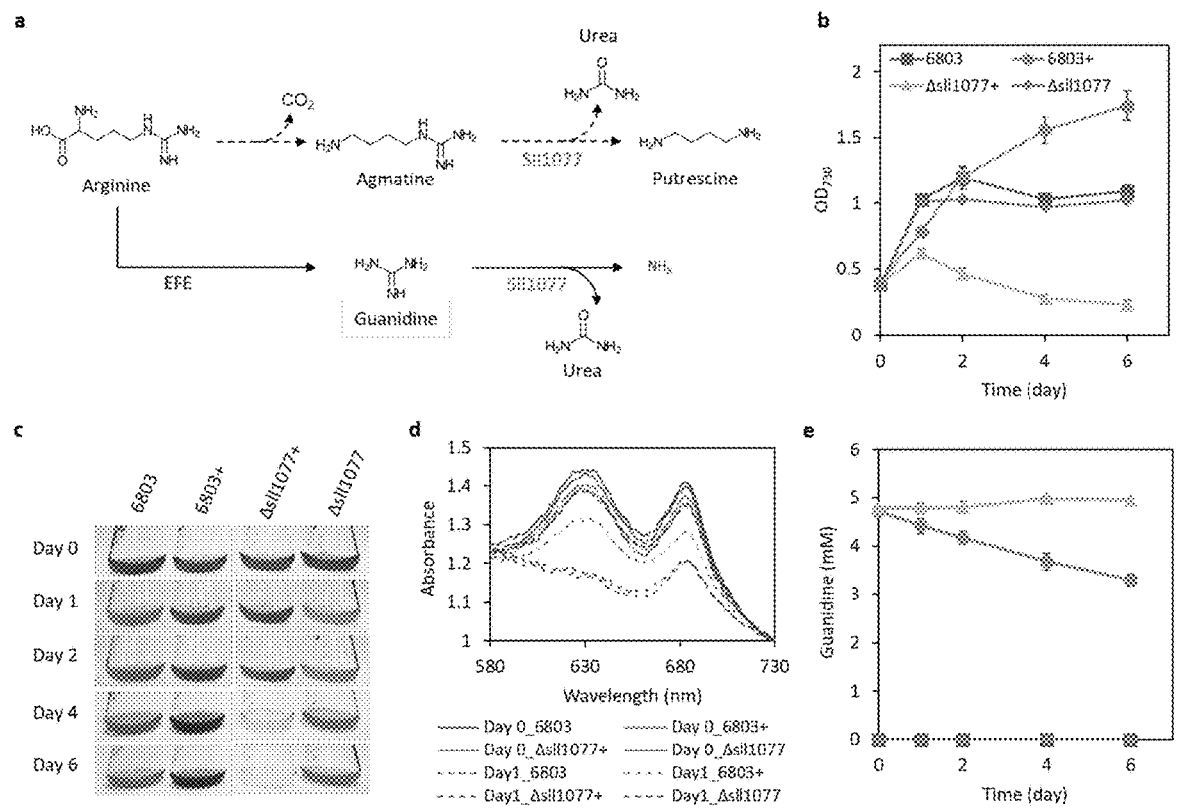
FIGS. 2a, 2b, 2c, 2d, and 2e depict gene sll1077 is responsible for guanidine degradation in *Synechocystis* 6803.

Without being limited by theory, Sll1077 is responsible for guanidine degradation in Synechocystis 6803. A comparative proteomic study of the wild-type Synechocystis 6803 and the guanidine-producing (efe-expressing) strain, JU54722, showed that the expression of Sll1077, a putative agmatinase, increased by 10-fold in strain JU547 compared to that in the wild-type Synechocystis 6803 (Table 1). Since agmatinase cleaves the C—N bond within the guanidyl moiety of agmatine, which releases putrescine and urea23, we hypothesized that Sll1077 might be involved in the metabolism of guanidine in Synechocystis 6803 (FIG. 2a). Knockout of sll1077 in Synechocystis 6803, leading to strain PB805W (Δsll1077), did not have any apparent physiological effects on the cells under normal growth conditions or under nitrate-deprived conditions (FIGS. 2b-2d). Nevertheless, deletion of sll1077 dramatically retarded the degradation of the light harvesting components, i.e., phycobiliproteins (absorbance at 630 nm) and chlorophyll a (absorbance at 680 nm), and the cell growth of Δsll1077 was severely inhibited under guanidine-supplemented conditions compared to nitrogen-deprived culture conditions (FIGS. 2b-2d). Further analysis revealed that the guanidine degradation capability was abolished in the Δsll1077 strain (FIG. 2e), a phenotype similar to that of Synechococcus 7942 (FIG. 1a). In addition, during the first day, the biomass of strain Δsll1077 incubated with guanidine increased to a much less extent relative to other parallel cases; in the next few days, the biomass of strain Δsll1077 incubated with guanidine underwent an autolysis process and the light harvesting complex gradually deteriorated.

TABLE 1

Comparative proteomics for Synechocystis PCC 6803 and JU547.*

| #Locus | Fold Change | pValue | NSAF for PCC 6803 | NSAF for JU547 | Description |
|---|---|---|---|---|---|
| EFE_Ethylene-forming | 278 | 0.000263 | <2.81E−05 | 0.007812 | enzyme OS = Synechocystis sp. (strain PCC 6803) |
| sp_P73270_SPEB2_SYNY3 | 20.3 | 0.000927 | 2.81E−05 | 5.71E−04 | Sll1077; Probable agmatinase 2 OS = Synechocystis sp. (strain PCC 6803/Kazusa) GN = speB2 PE = 3 SV = 1 |
| tr_P73267_P73267_SYNY | 5.34 | 0.008612 | 1.04E−04 | 0.000558 | Sll1080 protein OS = Synechocystis sp. (strain PCC 6803/Kazusa) GN = sll1080 PE = 4 SV = 1 |
| tr_P73268_P73268_SYNY | 4.35 | 0.1501 | <5.36E−05 | 2.33E−04 | Sll1079; Hydrogenase expression/formation protein HypB OS = Synechocystis sp. (strain PCC 6803/Kazusa) GN = hypB PE = 4 SV = 1 |
| tr_P73886_P73886_SYNY | 1.69 | 0.047647 | 0.00036 | 6.10E−04 | Ribosome-binding ATPase YchF OS = Synechocystis sp. (strain PCC 6803/Kazusa) GN = ychF PE = 3 SV = 1 |
| tr_P74314_P74314_SYNY | 1.67 | 0.016061 | 2.81E−04 | 4.69E−04 | OmpR subfamily OS = Synechocystis sp. (strain PCC 6803/Kazusa) GN = slr0947 PE = 4 SV = 1 |
| tr_P73546_P73546_SYNY | 1.55 | 0.025467 | 0.000365 | 0.000566 | Alpha-1,4 glucan phosphorylase OS = Synechocystis sp. (strain PCC 6803/Kazusa) GN = glgP PE = 3 SV = 1 |
| sp_P73530_RS1A_SYNY3 | 1.50 | 0.016182 | 1.42E−03 | 2.13E−03 | 30S ribosomal protein S1 homolog A OS = Synechocystis sp. (strain PCC 6803/Kazusa) GN = rps1A PE = 3 SV = 1 |
| sp_P21697_PLAS_SYNY3 | 1.48 | 0.007126 | 3.22E−03 | 0.004768 | Plastocyanin OS = Synechocystis sp. (strain PCC 6803/Kazusa) GN = petE PE = 1 SV = 1 |
| tr_Q55199_Q55199_SYNY | −1.35 | 0.003676 | 5.25E−04 | 0.00039 | Phosphate-binding protein OS = Synechocystis sp. (strain PCC 6803/Kazusa) GN = pstS PE = 3 SV = 1 |
| sp_P27179_ATPA_SYNY3 | −1.40 | 0.001025 | 5.19E−03 | 0.00371 | ATP synthase subunit alpha OS = Synechocystis sp. (strain PCC 6803/Kazusa) GN = atpA PE = 3 SV = 1 |
| sp_P36237_RL11_SYNY3 | −1.51 | 0.009794 | 5.56E−03 | 0.003688 | 50S ribosomal protein L11 OS = Synechocystis sp. (strain PCC 6803/Kazusa) GN = rplK PE = 3 SV = 1 |
| sp_P27180_ATPD_SYNY3 | −1.52 | 0.014717 | 0.000626 | 0.000412 | ATP synthase subunit delta OS = Synechocystis sp. (strain PCC 6803/Kazusa) GN = atpH PE = 3 SV = 1 |
| sp_Q55664_ALF2_SYNY3 | −1.53 | 0.000327 | 5.73E−03 | 3.75E−03 | Fructose-bisphosphate aldolase class 2 OS = Synechocystis sp. (strain PCC 6803/Kazusa) GN = fbaA PE = 1 SV = 3 |
| tr_P74769_P74769_SYNY | −1.54 | 0.014917 | 1.91E−03 | 0.001239 | Ssr1528 protein OS = Synechocystis sp. (strain PCC 6803/Kazusa) GN = ssr1528 PE = 4 SV = 1 |
| sp_P74410_RS16_SYNY3 | −1.57 | 0.013248 | 1.48E−03 | 0.000947 | 30S ribosomal protein S16 OS = Synechocystis sp. (strain PCC 6803/Kazusa) GN = rpsP PE = 3 SV = 1 |

TABLE 1-continued

Comparative proteomics for *Synechocystis* PCC 6803 and JU547.*

| #Locus | Fold Change | pValue | NSAF for PCC 6803 | NSAF for JU547 | Description |
| --- | --- | --- | --- | --- | --- |
| sp_P42352_RL9_SYNY3 | −1.57 | 0.03309 | 0.003878 | 2.46E−03 | 50S ribosomal protein L9 OS = *Synechocystis* sp. (strain PCC 6803/Kazusa) GN = rplI PE = 3 SV = 2 |
| tr_P73037_P73037_SYNY | −1.58 | 0.015387 | 4.24E−03 | 0.002679 | Peptidyl-prolyl cis-trans isomerase OS = *Synechocystis* sp. (strain PCC 6803/Kazusa) GN = ytfC PE = 4 SV = 1 |
| sp_P73851_SYDND_SYNY3 | −1.68 | 0.030414 | 0.000637 | 0.000379 | Aspartate-tRNA(Asp/Asn) ligase OS = *Synechocystis* sp. (strain PCC 6803/Kazusa) GN = aspS PE = 3 SV = 1 |
| sp_Q55781_FTRV_SYNY3 | −1.69 | 0.007735 | 7.10E−04 | 4.20E−04 | Ferredoxin-thioredoxin reductase, variable chain OS = *Synechocystis* sp. (strain PCC 6803/Kazusa) GN = ftrV PE = 1 SV = 1 |
| sp_P73824_GPX2_SYNY3 | −1.72 | 0.01956 | 1.25E−03 | 7.26E−04 | Hydroperoxy fatty acid reductase gpx2 OS = *Synechocystis* sp. (strain PCC 6803/Kazusa) GN = gpx2 PE = 1 SV = 1 |
| sp_P26533_ATPE_SYNY3 | −1.73 | 0.028933 | 0.000841 | 0.000486 | ATP synthase epsilon chain OS = *Synechocystis* sp. (strain PCC 6803/Kazusa) GN = atpC PE = 1 SV = 3 |
| sp_P73636_RS6_SYNY3 | −1.73 | 0.019332 | 0.000946 | 0.000546 | 30S ribosomal protein S6 OS = *Synechocystis* sp. (strain PCC 6803/Kazusa) GN = rpsF PE = 3 SV = 1 |
| sp_Q55544_APCE_SYNY3 | −1.83 | 0.003729 | 1.14E−02 | 6.24E−03 | Phycobiliprotein ApcE OS = *Synechocystis* sp. (strain PCC 6803/Kazusa) GN = apcE PE = 1 SV = 1 |
| sp_P27183_ATPX_SYNY3 | −1.85 | 0.027033 | 2.02E−03 | 1.09E−03 | ATP synthase subunit b' OS = *Synechocystis* sp. (strain PCC 6803/Kazusa) GN = atpG PE = 3 SV = 1 |
| tr_P73173_P73173_SYNY | −1.90 | 0.007279 | 0.00059 | 0.00031 | PilJ protein OS = *Synechocystis* sp. (strain PCC 6803/Kazusa) GN = pilJ PE = 4 SV = 1 |
| sp_P27181_ATPF_SYNY3 | −1.92 | 0.018123 | 0.002426 | 0.001262 | ATP synthase subunit b OS = *Synechocystis* sp. (strain PCC 6803/Kazusa) GN = atpF PE = 3 SV = 2 |
| tr_P74175_P74175_SYNY | −2.07 | 0.00072 | 1.17E−03 | 0.000564 | HlyD family of secretion proteins OS = *Synechocystis* sp. (strain PCC 6803/Kazusa) GN = hlyD PE = 4 SV = 1 |
| sp_P72689_IF2_SYNY3 | −2.28 | 0.01916 | 0.002611 | 0.001147 | Translation initiation factor IF-2 OS = *Synechocystis* sp. (strain PCC 6803/Kazusa) GN = infB PE = 3 SV = 1 |
| sp_P72656_RNE_SYNY3 | −2.33 | 0.034951 | 0.000748 | 3.21E−04 | Ribonuclease E/G-like protein OS = *Synechocystis* sp. (strain PCC 6803/Kazusa) GN = rne PE = 3 SV = 1 |
| sp_P74615_Y1483_SYNY3 | −2.46 | 0.001977 | 4.62E−04 | 1.88E−04 | Uncharacterized protein sll1483 OS = *Synechocystis* sp. (strain PCC 6803/Kazusa) GN = sll1483 PE = 3 SV = 1 |
| sp_P27589_PETD_SYNY3 | −2.62 | 0.021749 | 0.00048 | 0.000183 | Cytochrome b6-f complex subunit 4 OS = *Synechocystis* sp. (strain PCC 6803/Kazusa) GN = petD PE = 3 SV = 1 |
| tr_P74485_P74485_SYNY | −2.66 | 0.023989 | 1.78E−03 | 6.71E−04 | Sll1863 protein OS = *Synechocystis* sp. (strain PCC 6803/Kazusa) GN = sll1863 PE = 4 SV = 1 |
| sp_P54123_RNJ_SYNY3 | −3.31 | 0.000549 | 6.98E−04 | 2.11E−04 | Ribonuclease J OS = *Synechocystis* sp. (strain PCC 6803/Kazusa) GN = rnj PE = 3 SV = 1 |
| tr_P72758_P72758_SYNY | −5.47 | 4.17E−05 | 0.001329 | 0.000243 | Carbon dioxide concentrating mechanism protein CcmM OS = *Synechocystis* sp. (strain PCC 6803/Kazusa) GN = ccmM PE = 1 SV = 1 |

*The positive sign in the column of "Fold Change" means the relative abundance of the target protein in JU547 compared to the wild type strain *Synechocystis* PCC 6803; Negative sign means the relative abundance of the target protein in the wild type strain *Synechocystis* PCC 6803 compared to JU547.

Figures 3A, 3B, 3C, 3D:
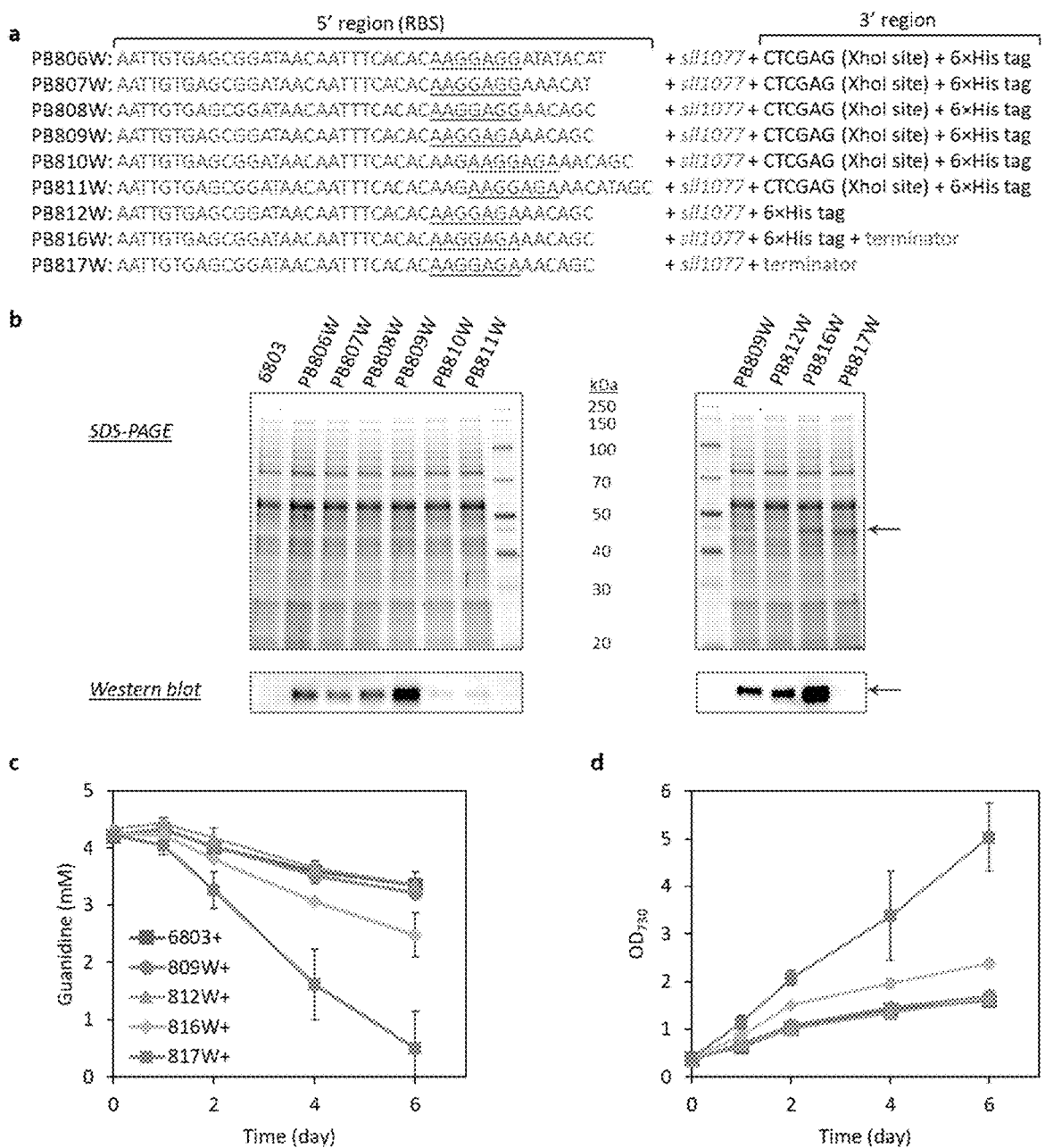
FIGS. 3a, 3b, and 3c depict that overexpression of Sll1077 accelerates guanidine degradation and promotes biomass growth in *Synechocystis* 6803.
FIG. 3d depicts cell growth curves for *Synechocystis* 6803 and sll1077-overexpressing strains, indicated by readings of $OD_{730}$ of cell cultures. Data represent means and standard derivations from three biological replicates.

Overexpression of sll1077 in *Synechocystis* 6803 was optimized through modifying the ribosome binding site (RBS) at the 5' region as well as tailoring the 3' region (FIG. 3a). Among the six tested RBSs, RBSv309 in strain PB809W rendered the strongest expression level (FIG. 3b). While removal of the XhoI restriction site between the sll1077 and the 6×His tag sequence at the 3' region in strain PB812W did not have any apparent effect on the sll1077 expression level, adding the rrnB T1T2 terminator (from *E. coli*) to the 3' region significantly improved the expression of sll1077 in PB816W (FIGS. 3a, 3b). Strain PB816W was able to degrade guanidine at a rate approximately 80% faster than the wild-type *Synechocystis* 6803, which led to a faster cell growth rate in nitrate-deprived medium (FIGS. 3c, 3d). Interestingly, although removal of the 6×His tag sequence from the 3' end of sll1077 did not affect the protein expression level (FIG. 3b), it increased the guanidine degradation rate by about two times and substantially increased the cell growth rate of PB817W (FIGS. 3c, 3d), suggesting that the C-terminus 6×His tag severely impairs the guanidine-degrading enzyme activity of Sll1077.

Figures 4A, 4B, 4C, 4D, 4E:
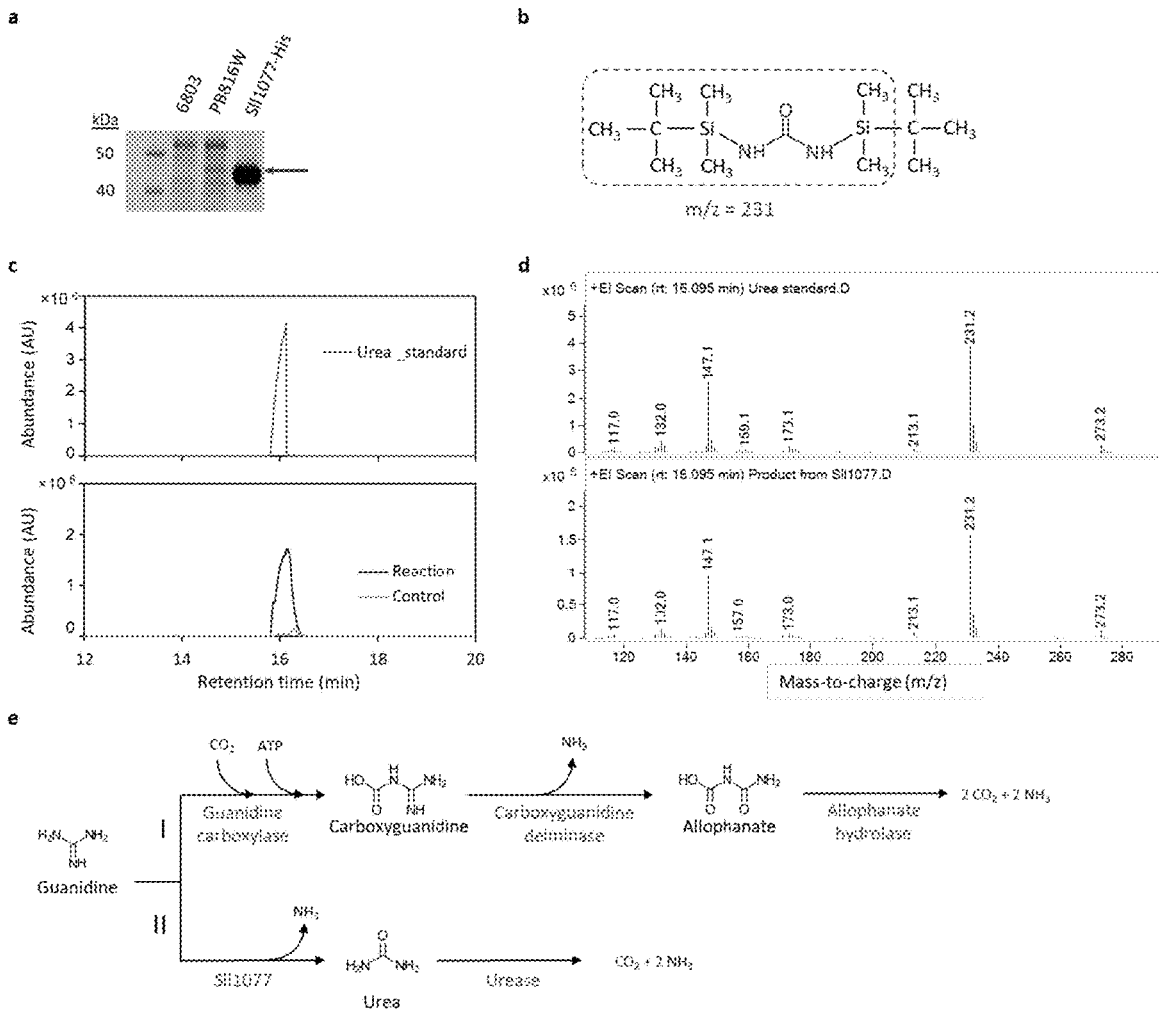
FIGS. 4a, 4b, 4c, 4d, and 4e depict the guanidine-degrading enzyme activity of Sll1077 through an in vitro enzyme activity assay.

In order to verify that guanidine is degraded by Sll1077 to form urea, according to the enzymatic mechanism of the agmatinase/arginase superfamily, Sll1077-His was purified from the crude cell lysate of *Synechocystis* strain PB816W (FIG. 3b). Purified Sll1077-His showed an apparent molecular weight of ~45 kDa which is consistent with the predicted molecular weight of 43.8 kDa (FIG. 4a). Incubation of purified Sll1077-His with guanidine at 30° C. resulted in hydrolysis of guanidine and release of urea (FIGS. 4b-4d). It is noteworthy that no reducing factors, such as ATP or NAD(P)H, are required to drive the guanidine hydrolysis enzymatic activity of Sll1077, which seems to be more energy-efficient compared to the previously reported guanidine carboxylation pathway (FIG. 4e).

Figures 5A, 5B, 5C, 5D:
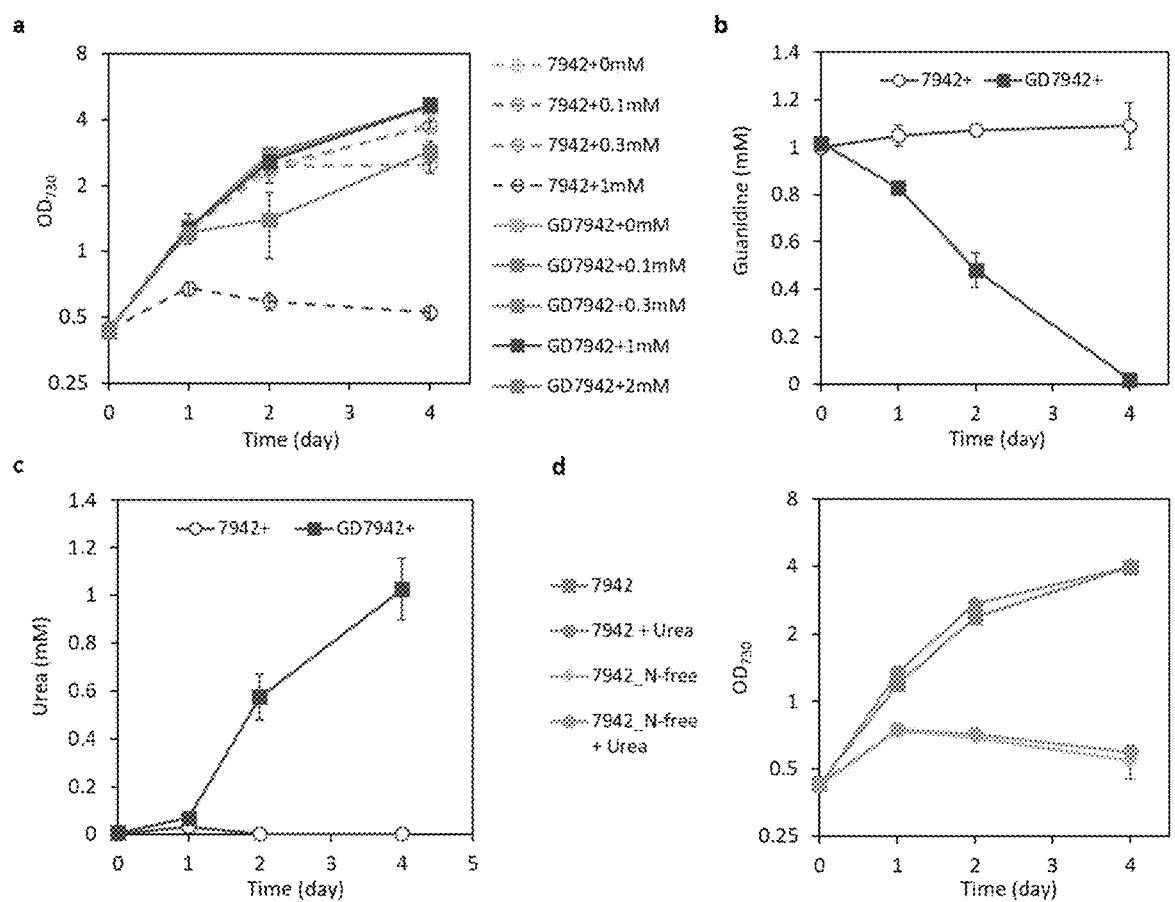
FIGS. 5a, 5b, 5c, and 5d depicts that the expression of sll1077 improves the tolerance of *Synechococcus elongatus* 7942 to guanidine.

Expression of sll1077 improves tolerance of *Synechococcus* 7942 to guanidine. In order to examine if expressing a recombinant enzyme, Sll1077 from *Synechocystis* 6803, could endow the guanidine degradation capability in a host strain that does not naturally degrade guanidine, we expressed sll1077 in *Synechococcus* 7942, resulting in strain GD7942 (+sll1077). While the cell growth of *Synechococcus* 7942 was already inhibited by guanidine at concentrations as low as 0.3 mM and was severely inhibited by 1 mM guanidine under photoautotrophic conditions (FIG. 5a), the sll1077-expressing strain GD7942 gained significant tolerance to exogenous guanidine. Particularly, the cell growth of strain GD7942 was not apparently repressed by as much as 1 mM guanidine present in the culture medium, and was only slightly inhibited by 2 mM guanidine (FIG. 5a). We further examined the fate of the exogenous guanidine in the culture medium containing 1 mM guanidine. While no guanidine degradation occurred in the culture of wild-type *Synechococcus* 7942, the guanidine added into the culture medium of the GD7942 strain was completely degraded over 4 days of photoautotrophic cultivation (FIG. 5b). Since the wild-type *Synechococcus* 7942 does not have any urea biosynthesis or degradation pathways, it was expected that urea would be accumulated in the GD7942 culture. Indeed, along with the degradation of guanidine, urea gradually accumulated in the culture supernatants to concentrations of about 1 mM by end of day 4 (FIG. 5c), which is consistent with the pathway annotation and enzymatic reaction stoichiometry (FIG. 2a). We further found that supplementing 5 mM urea into the culture medium of *Synechococcus* 7942 did not show any apparent impact on the cell growth under either nitrate-deprived or nitrate-replete culture conditions (FIG. 5d), suggesting that *Synechococcus* 7942 is highly tolerant to urea.

Figures 6A, 6B, 6C, 6D, 6E, 6F, 6G:
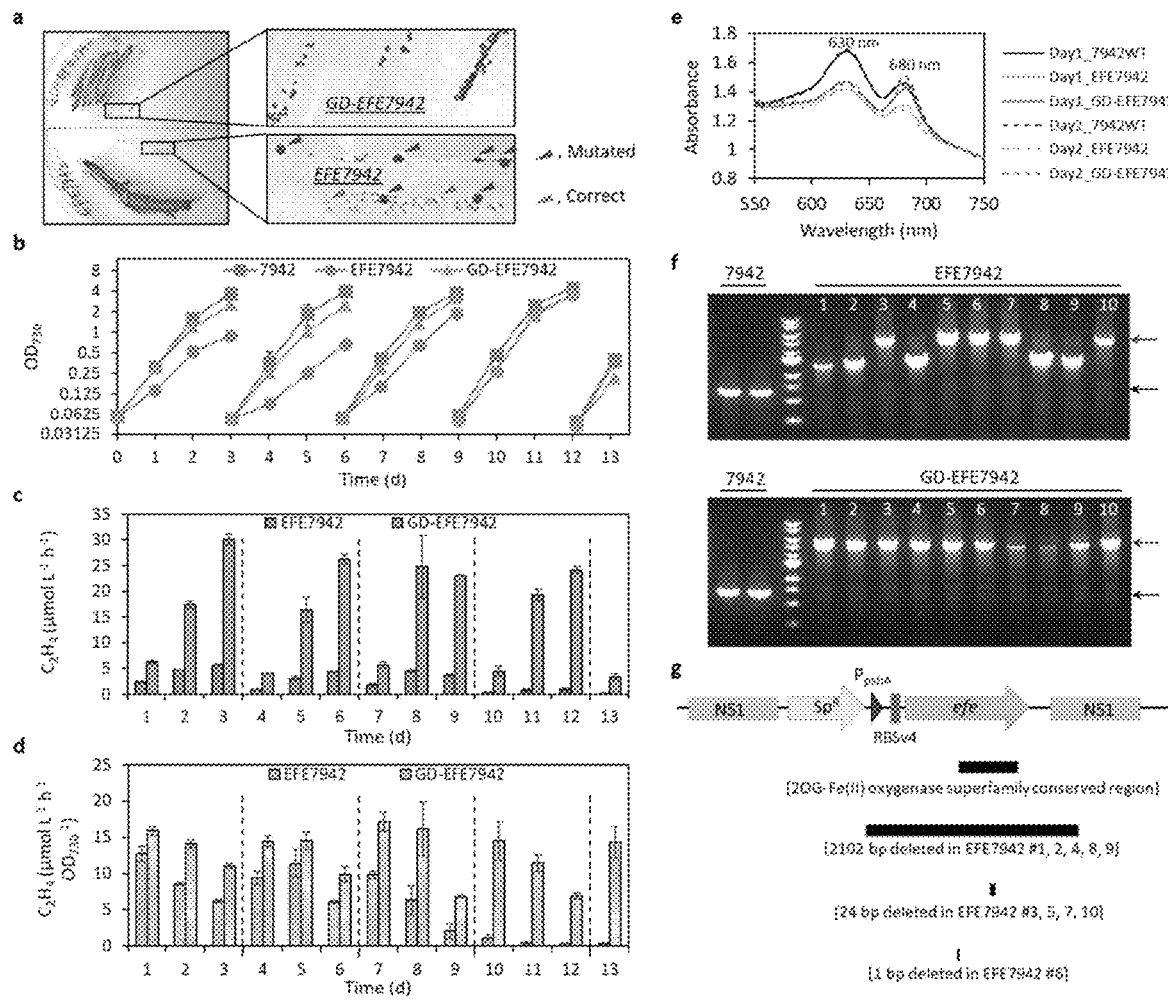
FIGS. 6a, 6b, 6c, 6d, 6e, 6f, and 6g depict expression of sll1077 in *Synechococcus* 7942 supports sustained high-level ethylene production.
Figures 8A, 8B:
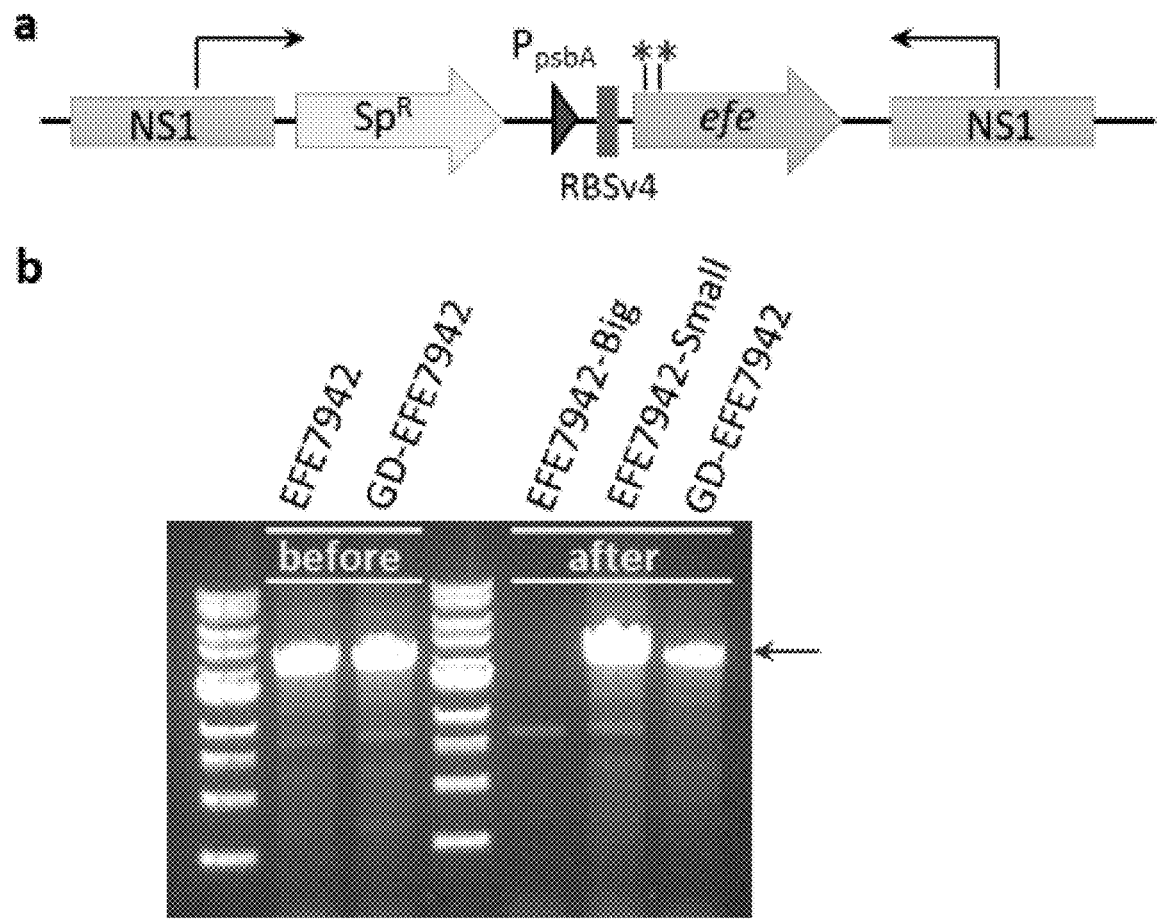
FIGS. 8a and 8b depict improved genomic stability of the efe-expressing *Synechococcus* 7942 derivative strain through co-overexpressing sll1077.

Co-expression of Sll1077 and EFE enhances genomic stability and sustains high-level ethylene formation in *Synechococcus* 7942. Given that the EFE reaction produces not only ethylene but also toxic guanidine, which might be responsible for the genomic instability observed upon expression of EFE alone in *Synechococcus* 7942, we examined if co-expressing Sll1077 and EFE in the *Synechococcus* 7942 host strain would render a stable genome and thereby sustained production of ethylene. We found that following the genetic transformation of *Synechococcus* 7942 and colony-restreaking on BG11 agar plates, the recombinant efe-expressing strain, EFE7942, grew considerably slower than wild-type and the initially formed colonies appeared yellow-greenish; subsequently, large and dark-green colonies grew up on the background of the smaller colonies (FIG. 6a). Cultivation of these "large" and "small" colonies in the liquid culture revealed that cells from the small colonies, but not from the large ones, retained photosynthetic ethylene productivity. Subsequent colony PCR and DNA sequencing results confirmed that cells from the small colonies retained the correct EFE expression cassette on their genomes, whereas the large colonies consisted of cells with mutations around the EFE expression cassette which abolished expression of EFE (FIG. 8). It is noteworthy that restreaking single small colonies onto fresh mBG11-agar plates supplemented with spectinomycin repeatedly resulted in a mixture of large and small colonies after 1-2 weeks of incubation at 30° C., indicating a constant selective pressure caused by the expression of EFE. In contrast, co-expression of Sll1077 with EFE in *Synechococcus* strain GD-EFE7942 resulted in uniform colony sizes on agar plates at 30° C. (FIG. 6a), and colony PCR and DNA sequencing confirmed that these cells were able to maintain the intact EFE expression cassette on their genome (FIG. 8), indicating relief of the selective pressure caused by the expression of EFE. Because EFE exhibits highest enzyme activity in the temperature range of 20-25° C. and becomes unstable at temperature above 30° C. 25, 26, we decided to routinely maintain strain EFE7942 at 35° C. to suppress the EFE activity and thereby prevent spontaneous mutations from occurring.

Figure 9:
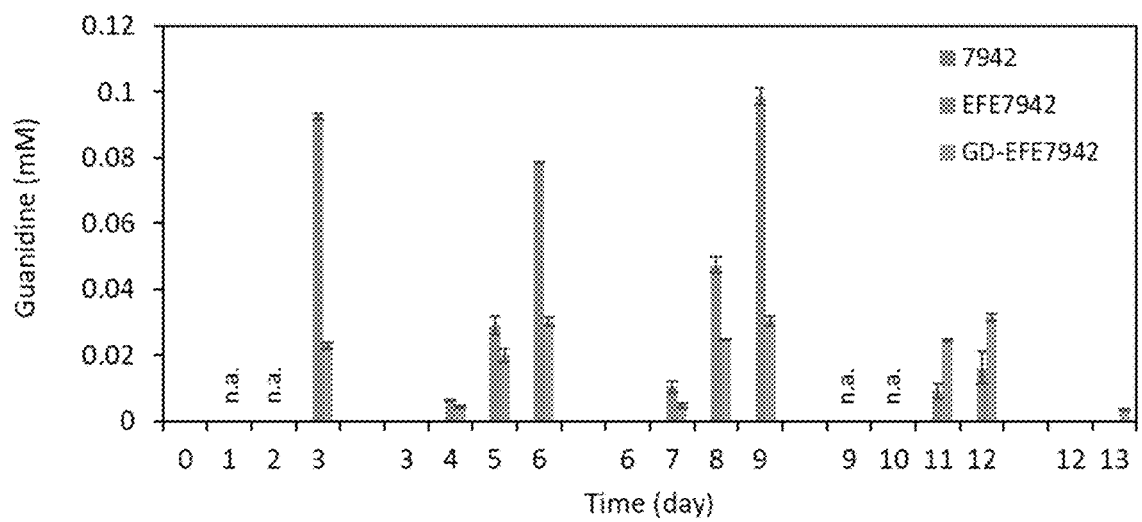
FIG. 9 depicts guanidine accumulative titers in the culture supernatants of *Synechococcus* strains. *Synechococcus* strains 7942, EFE7942 and GD-EFE7942 were grown under the same conditions as in FIGS. 6b-d. "n.a." means samples were not saved for analysis of guanidine. Batch #1, day 0-3; batch #2, day 3-6; batch #3, day 6-9; batch #4, day 9-12; batch #5, day 12-13. Data represent means and standard deviations of two biological replicates.
Figures 10A, 10B, 10C:
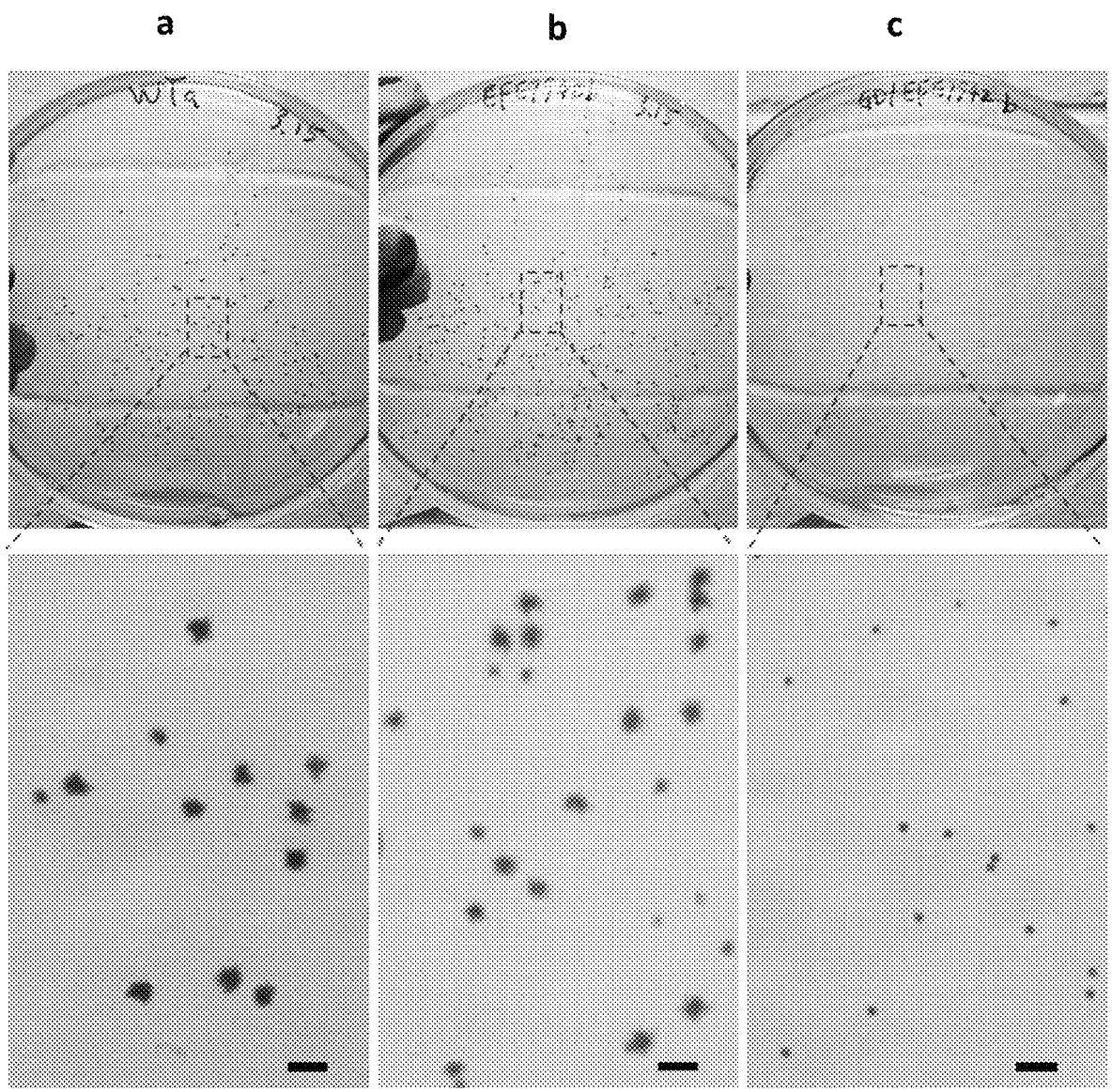
FIGS. 10a, 10b, and 10c depict colonies formed on agar plates spread with diluted 13$^{th}$ day cultures in FIGS. 6b-d. *Synechococcus* strains 7942, EFE7942 and GD-EFE7942 were grown under the same conditions as in FIGS. 6b-d were diluted and spread on to BG11 agar plates and incubated under light of ~15 $\mu E\ m^{-2}\ s^{-1}$ at ambient temperature for two weeks. Scale bars indicate 1 mm.
Figures 11A, 11B:
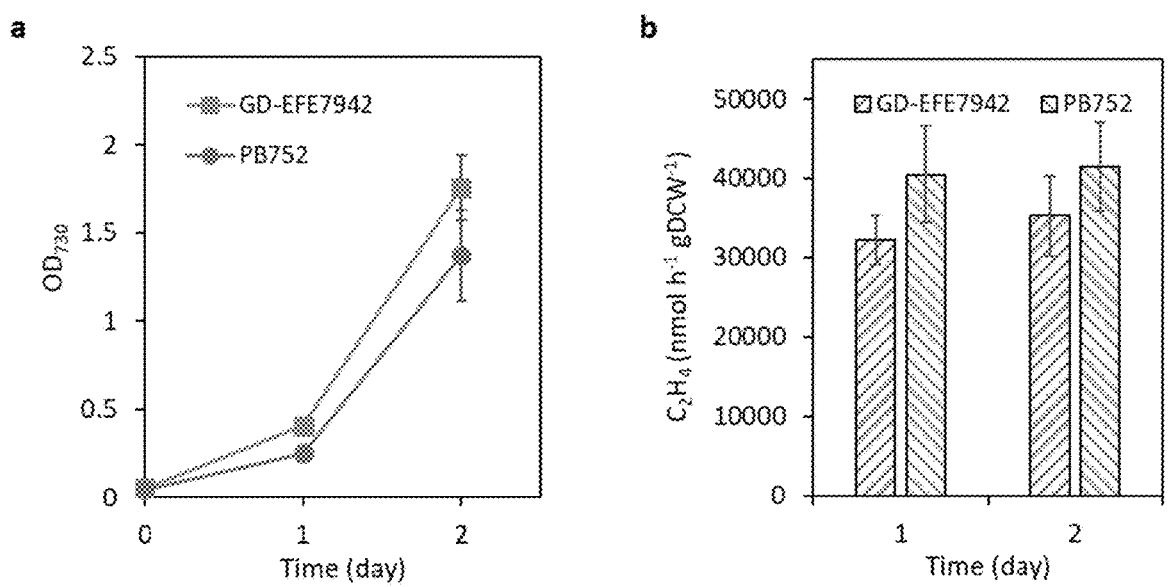
FIGS. 11a and 11b depict a comparison of ethylene productivities between efe-expressing *Synechococcus* strain GD-EFE7942 and *Synechocystis* strain PB752.
Figure 12:
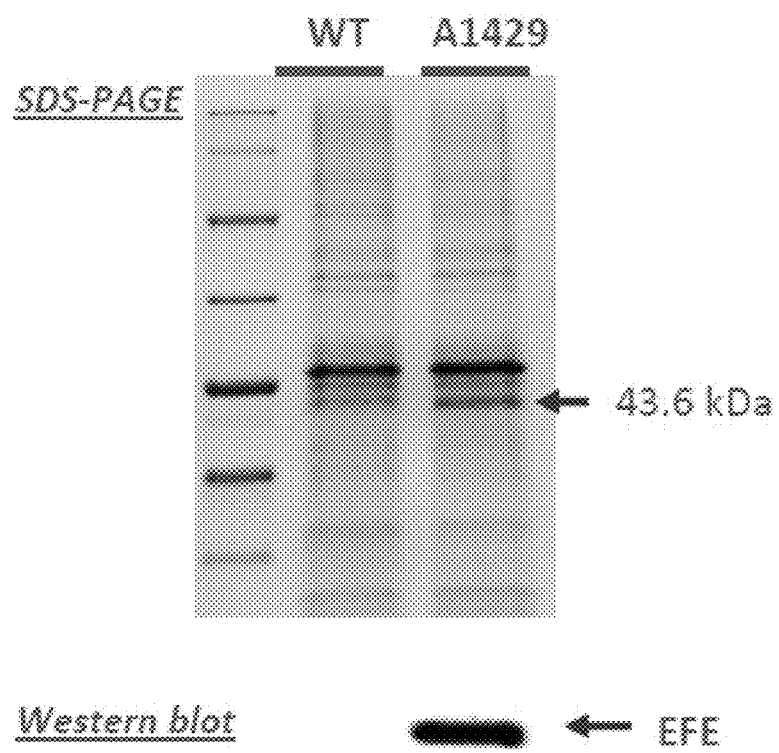
FIG. 12 depicts expression of EFE in a non-naturally occurring nitrogen fixing cyanobacterium *Anabaena* 7120 strain.
Figure 13:
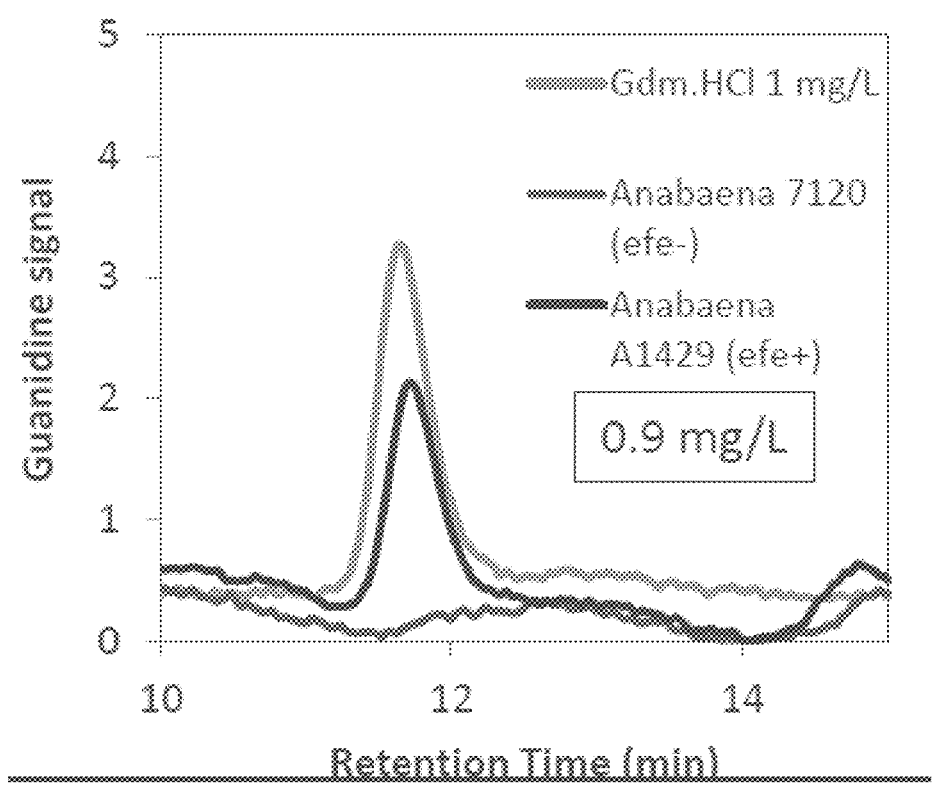
FIG. 13 depicts guanidine production in an *Anabaena* 7120 (efe−) strain and an *Anabaena* A1429 (efe+) strain. In an embodiment, guanidine is produced at a concentration of 0.9 mg/L.

The wild-type *Synechococcus* 7942 strain and the efe-expressing strains EFE7942 and GD-EFE7942 were then compared in regard to their cell growth rates and ethylene productivities in liquid cultures at 30° C. under photoautotrophic culture conditions. Initially, strain EFE7942 grew considerably slower than the wild-type *Synechococcus* 7942 strain, but gradually grew faster after subsequent re-inoculations, reaching a growth rate similar to that of the wild-type by day 13. In contrast, the GD-EFE7942 strain exhibited a slightly slower growth rate compared to the wild-type strain throughout the entire 13-day cultivation period (FIG. 6b). In terms of the ethylene production, during the first 9 days strain GD-EFE7942 showed 3-6 times higher volumetric ethylene productivities compared to strain EFE7942, with more substantial differences occurring at relatively high cell densities when guanidine accumulated to the highest levels in the culture medium (FIG. 6c, FIG. 9). The higher volumetric ethylene productivity of GD-EFE7942 relative to EFE7942 was largely due to the improved cell growth rate and thereby higher cell density (FIG. 6b) yet was also attributed to the improved specific ethylene productivity (FIG. 6d). During the first 7 days, the specific ethylene productivity of GD-EFE7942 was 1.2-1.8 times higher than EFE7942. The difference increased to 2.6 times by day 8, and to 3.3 times by day 9 (FIG. 6d). Starting from day 10, both the volumetric and specific ethylene productivities of strain EFE7942 dropped substantially and declined to almost zero by day 13 (FIG. 6c,d). The guanidine production in the EFE7942 culture also started to drop significantly by day 10 (FIG. 9). Absorbance spectra of the three examined cultures revealed that the abundance of phycobilisome and chlorophyll a in EFE7942 declined significantly compared to those in the wild-type strain. Although the phycobilisome level remained low in GD-EFE7942 relative to that of the wild-type strain, expression of Sll1077 restored the amount of chlorophyll a in GD-EFE7942 to a level similar to that in the wild-type strain (FIG. 6e). Further cell growth phenotyping and DNA sequencing analyses revealed that after 13 days of cultivation, approximately half the cells in the EFE7942 culture lost the entire EFE expression cassette, and the other half had DNA mutations on the genome that caused early termination of translation of EFE (FIG. 10 and FIGS. 6f-6g). By contrast, the GD-EFE7942 strain exhibited consistent cell growth profiles and ethylene productivities during the five consecutive batch cultures (FIG. 6b-6d), owing to its engineered capability to mitigate guanidine via Sll1077 (FIG. 5b, FIG. 9). In addition, the ethylene productivity of GD-EFE7942 is comparable to that of the previously engineered high-level-efe-expressing *Synechocystis* strains, e.g., strain PB752 in our previous work, under the examined photoautotrophic culture conditions (FIG. 11).

Through comparative analysis of cyanobacterial strains, we were able to identify a novel guanidine-degrading enzyme, 5111077, which breaks down guanidine to form urea and ammonium (FIGS. 2a, 4, 5b, 5c). Sll1077 constitutes a guanidine degradation pathway that does not require ATP and is completely different from the recently identified guanidine carboxylation pathway (FIG. 4e). Guanidine carboxylase catalyzes the carboxylation of guanidine using ATP as the driving force. However, the product compound carboxyguanidine is unstable and is readily hydrolyzed to form guanidine and $CO_2$ in water, forming an ATP-consuming futile cycle. The efficiency of the guanidine carboxylation pathway largely depends on the rate of removal of carboxyguanidine by the carboxyguanidine deiminase which converts carboxyguanidine to ammonium and allophanate. In contrast, the guanidine-degrading enzyme Sll1077 investigated in the current study acts as a deiminase and is able to, without consuming ATP, directly convert guanidine to urea which could be further degraded into $CO_2$ and ammonium by the urease in most cyanobacterial species, including Synechocystis 6803 (FIG. 4). Therefore, the Sll1077-associated guanidine degradation pathway seems more energy-efficient compared to the guanidine carboxylation pathway.

In an embodiment, strains and methods disclosed herein as relate to a new guanidine-degrading pathway through comparative proteomics of wild-type Synechocystis 6803 and a guanidine-producing strain, JU547. It was later reported that the expression of a class of genes previously annotated to encode "arginase" or "agmatinase" enzymes in a wide range of microorganisms, including sll1077 in Synechocystis 6803, is under the control of guanidine riboswitches. Our finding that Sll1077 is responsible for the degradation of guanidine suggests that this entire class of genes may be involved in the metabolism of guanidine. The prevalence of this pathway might be, at least partially, due to the competitive advantage for microbes to mitigate toxic guanidine in their environment and concomitantly recycle the nitrogen from this nitrogen-rich molecule which is produced by human body, P. syringae, and E. coli (and presumably other organisms) under certain growth conditions. The homologous genes of sll1077 often form operons with several downstream genes, including hypA, hypB and a gene encoding an ABC transporter substrate binding protein. For example, in Synechocystis 6803, sll1077 forms an operon with sll1078 (hypA), sll1079 (hypB) and sll1080. The expression levels of sll1077, hypA, hypB and sll1080 were all enhanced in guanidine-producing (i.e., efe-expressing) Synechocystis 6803 strains compared to wild-type controls according to our proteomic data (Table 1). HypA and HypB are annotated as hydrogenase maturation factors that are responsible for inserting the nickel ion into the metal center of NiFe hydrogenases, and Sll1080 is an ABC transporter substrate binding protein. The reason why expression of these genes are also under regulation of the guanidine riboswitch needs to be investigated in the future.

Synechococcus 7942 does not have the capability to degrade guanidine, and no sll1077 homologs or guanidine carboxylase homologs are found in its genome. Analysis of its genome revealed that all known urea-forming and urea-degrading pathways are missing from Synechococcus 7942, which is consistent with our finding in this study that urea was not assimilated by Synechococcus 7942 (FIG. 5c, 5d). Complete absence of genes associated with urea metabolism is rare among cyanobacterial species. Without being bound by theory, it seems that Synechococcus 7942 has evolved a mechanism to thrive without engaging urea-associated genes. Instead of utilizing an arginase/agmatinase to convert arginine/agmatine into ornithine/putrescine and urea (FIG. 2a), Synechococcus 7942 employs arginine decarboxylase to convert arginine to agmatine which is further metabolized through agmatine deiminase and N-carbamoylputrescine hydrolase to produce two ammonium, $CO_2$ and putrescine without forming urea. In addition, Synechococcus 7942 was initially isolated from "small rain-filled pools" where urea is unlikely to form from the environment to nourish the cells. These factors could explain why Synechococcus 7942 eliminated the "metabolic burden" of maintaining urea-degrading pathways during evolution, which is also reflected in its relatively small genome (2.70 Mb) compared Synechocystis 6803 (3.57 Mb) and many other cyanobacterial species.

Guanidine is toxic to cyanobacterial cells. Guanidine is known to interact with the peptide backbone and side chains of amino acids and serves as a protein denaturant when applied at high concentrations (2-6 M). At concentrations insufficient to completely unravel the protein structure, guanidine could also be detrimental to biomacromolecules. For example, relatively small amounts of guanidine could trigger unfolding of the active site of ribonuclease A and thereby inactivate the enzyme activity and facilitate the proteolysis process. Another example is that millimolar guanidine could significantly inhibit ammonium nitrification in the nitrifying bacteria in soil. The presence of guanidine in the culture medium, either from exogenous or endogenous sources, severely inhibited cell growth of wild-type Synechococcus 7942 and the Synechocystis Δsll1077 strain (FIGS. 1a, 1b, 2c, 2d, 5a, 6a, 6b). These guanidine-sensitive strains exhibited remarkably slow degradation of their light harvesting components under nitrate-deprived and guanidine-supplemented culture conditions (FIG. 1a, 2c,d). Under nitrogen-poor culture conditions, cyanobacterial cells typically undergo a chlorosis process that involves degrading their phycobiliproteins and chlorophyll as a nitrogen source to support cell growth while simultaneously downregulating photosynthesis in order to reduce the generation of damaging oxygen radicals. Impaired cell growth and retarded pigment degradation in both cultures of Synechocystis 6803+ and Δsll1077+ on day 1 (FIG. 2b-2d) suggested that induction of nitrogen chlorosis was disrupted by guanidine under the examined culture conditions. Furthermore, the biosynthesis of phycobiliproteins and chlorophyll was severely inhibited in strain Synechococcus EFE7942, whereas the biosynthesis of chlorophyll was restored through heterologous expression of Sll1077 in strain GD-EFE7942 (FIG. 6e), which provided additional evidence that guanidine hampers the biosynthesis and remodeling of photosynthesis-related pigments in cyanobacteria.

While wild-type Synechococcus 7942 is sensitive to guanidine and fails to accommodate high-level expression of EFE (FIGS. 1a, 1b, 5a, 6), as disclosed herein, the discovery of the guanidine-degrading activity of Sll1077 was leveraged to generate a derivative strain of Synechococcus 7942 that exhibits enhanced genomic stability and stable high-level production of ethylene in prolonged culture, which has not been achieved in prior studies (FIGS. 6, 10). It is noteworthy that co-expression of Sll1077 with EFE substantially attenuate, but does not completely eliminate, the accumulation of guanidine in cultures of the engineered Synechococcus GD-EFE7942 strain (FIG. 9). Although this seems already sufficient for rendering genomic stability and sustained stable ethylene production in GD-EFE7942 (FIG. 6, 8), as well as the Synechocystis strain PB752, it could be possible to obtain a more efficient guanidine-degrading enzyme, perhaps through directed evolution of Sll1077, in order to achieve faster degradation of guanidine and further reduce its toxicity in the future. In summary, this study has expanded our understanding of the biological routes of guanidine metabolism in nature by identifying Sll1077 (and perhaps its analogs in other microorganisms) as a novel guanidine-degrading enzyme and demonstrating its potential biotechnological application to enhance ethylene production in engineered microorganisms.

Photosynthetic Ammonia Production from Nitrogen-Fixing Cyanobacteria.

The oceans are the largest potential carbon sink on earth, and this potential can be realized by ocean fertilization. Ocean fertilization is an approach to achieve billion-tons per year carbon sequestration. Most regions of the ocean have low nitrogen (N) levels, and addition of N fertilizer in such regions has stimulated algae growth and carbon sequestration via sedimentation. The problem is that conventional N fertilizer production by Haber-Bosch process has large carbon footprint. Here, we propose a carbon-negative technology, photosynthetic ammonia production from N-fixing cyanobacteria. We will develop cyanobacteria strains capable of secreting ammonia. Such strains will be cultivated at acre-scale as seed cultures. Upon release into ocean, the cyanobacteria will continue to grow and secrete ammonia to accelerate marine biomass growth. This technology, from seed culture to accelerated biomass growth and carbon sequestration, is powered by sunlight and occurs at ambient temperature and pressure. The bio-fertilizer can also be applied to cropland and other land areas as well as low N lakes.

While naturally occurring N-fixing cyanobacteria do not secret ammonia or other N fertilizer, my lab has engineered strains that secrete a N-rich compound guanidine, and discovered an enzyme that convert guanidine to ammonia. Guanidine production is enabled by expression of EFE gene via genetic engineering. Guanidine conversion to ammonia is catalyzed by guanidinase which is present in some but not all cyanobacteria. Guanidinase also produces urea which is a fertilizer molecule and can be converted to ammonia via the common urease. These findings form the basis of the proposed carbon sequestration technology. Growing seed culture sequesters $CO_2$, the carbon sequestration is then amplified by nature via continued cyanobacterial growth and ammonia secretion leading to accelerated biomass formation.

Photosynthesis on land and in water is nature's primary carbon sequestration mechanism. For example, soil is a major carbon sink, and oceans and freshwater lakes each sequester about 2 billion tons of $CO_2$ per year through photosynthesis and sedimentation. These carbon sequestration rates can theoretically be increased with addition of N-fixing cyanobacteria. However, deployment of bio-fertilizer in the context of geo-engineering has not been reported. Bio-fertilizer has been studied at small scales using naturally occurring N-fixing cyanobacteria to promote crop growth and soil health. My team is not aware of similar studies in water/seawater.

Naturally occurring N-fixing cyanobacteria can be effective in promoting large scale carbon sequestration, but the amount of nitrogen fixed is too low for such purpose, and we disclose herein methods and compositions of matter to increase the nutrient output using genetically engineered strains. N-fixing reactions consume cellular energy, thus they are regulated in the cells to prevent wasteful metabolism. The amount of nitrogen fixed is limited by the feedback regulation, where N-fixing reactions are inhibited when fixed nitrogen is available in the environment or is abundant in the cells. In an embodiment, the feedback inhibition can be released by engineered secretion of fixed nitrogen in the form of guanidine/ammonia/urea, resulting in faster nitrogen fixation. This is based on related observations of the release of feedback inhibition in photosynthesis by the secretion of fixed carbon (ethylene, lactic acid, sucrose etc.) in engineered cyanobacteria, leading to enhanced carbon fixation rates. In an embodiment, releasing feedback inhibition in biological N-fixation is disclosed herein.

In an embodiment, the methods and engineered organisms are useful to help fishery by stimulating plankton growth, thus increasing food supply from ocean and lakes.

In an embodiment, a differentiator for the methods and non-naturally occurring organisms disclosed herein is deploying tiny factories that replicate and make ammonia on their own by photosynthesis, thus amplify the initial seed culture carbon sequestration via enhanced plants/algae carbon fixation in nature. This approach requires less energy than working on 500 million tons of $CO_2$ with another approach that does not benefit from amplification by nature. By using naturally occurring N-fixing cyanobacteria, a 280-fold amplification is achieved in soil test with corn seedlings. In other words, the amount of increased organic carbon in soil and in corn seedlings was 280 times of the carbon embedded in the cyanobacteria that was applied to the soil. Engineered bio-fertilizer strains, as proposed here, are designed to out-perform naturally occurring strains. If the 280-fold amplification to calculate the amount of seed culture needed to reach a goal of 500 million tons of $CO_2$ sequestration, the seed cultures need to fix 2 million tons of $CO_2$ or producing about 1 million tons of cyanobacteria biomass. Even though growing cyanobacteria in multi-acre open ponds and hundreds of tons biomass per year is relatively mature technology, the one million ton biomass scale is larger than that of current worldwide microalgae cultivation. At current open pond microalgae productivity of 30 T per acre per year, about 30000 acres total will be needed to produce the seed culture. Higher productivity (by several fold is achievable with biofilm reactors. This means that hundreds of sites around the world will be needed to grow seed cultures. In an embodiment, the sites have different scales depending on space availability, from a few acres to hundreds of acres. In a prophetic embodiment, a 100-acre site that can produce 10000 T (dry mass) seed culture with biofilm reactors may lead to sequestration of 2.8 million tons $CO_2$ per year.

Using naturally occurring cyanobacteria, guanidine/ammonia/urea production rate from atmospheric nitrogen concentrations is currently about 0.43 mg/L over seven days. In a prophetic embodiment, using the non-naturally occurring cyanobacteria disclosed herein, the production rate from atmospheric nitrogen is from 4.3 mg/L to 20 mg/L over seven days.

In another embodiment, biological conversion of atmosphere nitrogen to urea and ammonia via expression of efe, guanidinase and transporter genes in a robust non-naturally occurring N-fixing cyanobacterium is disclosed herein.

In an embodiment, the cyanobacterium strain used is *Anabaena* 7120 that has been grown in the lab in low light. As a result of this artificial selection, it has evolved to be a low light strain that bleaches in outdoor-like high light conditions. This loss of robustness severely limits growth and guanidine productivity as well as deployment potential. In an embodiment, a non-naturally occurring N-fixing cyanobacterium, *Anabaena* sp 33047 is capable of robust growth in outdoor conditions in seawater and is amenable to genetic modification. In an embodiment guanidine producing strains are created by introducing efe gene under the regulation of a collection of promoters that we developed and demonstrate guanidine production under N-fixing conditions. In an embodiment efe variants are created to produce guanidine but not ethylene.

Production of Ammonia and Urea.

In an embodiment, the production of ammonia or urea can happen inside or outside of cyanobacterial cells depending on if guanidine is efficiently secreted. Guanidine-secreting cyanobacteria disclosed herein contain much higher concentrations of guanidine inside cells than in the medium, indicating lack of efficient guanidine export. Guanidine transport proteins can be introduced into guanidine producing N-fixing cyanobacteria to move guanidine outside of cells and to relieve feedback inhibition on nitrogen fixation reactions. In an embodiment, guanidinase is engineered to be exported outside of the cyanobacterium, to convert guanidine to ammonia and urea. In another embodiment, guanidine is hydrolyzed inside the cyanobacterial cells by guanidinase and urea is degraded to ammonia, and the final product ammonia is exported with a transporter.

In another embodiment, non-naturally occurring cyanobacteria disclosed herein are useful for generating biofertilizer in seawater for seaweed growth.

Materials and Methods

Bacterial strains and growth conditions. *E. coli* NEB5α (New England BioLabs, MA, USA) served as the microbial host for cloning and maintaining all recombinant plasmids, and was routinely grown in LB medium. *Synechocystis* and *Synechococcus elongatus* strains were typically grown in a modified BG11 medium (mBG11) as described before, and N-tris(hydroxymethyl)methyl-2-aminoethanesulfonic acid (TES) and NaHCO$_3$ were supplemented to final concentrations of 20 mM and 100 mM, respectively, unless otherwise specified. The medium was filtered through sterile 0.22 μm membranes before use. Cyanobacterial liquid cultures were grown under constant light of about 50 μE m$^{-2}$ s$^{-1}$ on a rotary shaker at 150 rpm and 30° C. in a Percival chamber (Percival Scientific, Inc., IA, USA) aerated with 5% CO$_2$ unless otherwise specified. When cyanobacteria were grown on solid medium, 10 mM TES, 3 g L-1 thiosulfate and 15 g L$^{-1}$ agar were supplemented to the mBG11 medium, and sterilized by autoclaving at 121° C. for 30 min. When appropriate, antibiotics were added to the solid medium to the following final concentrations: 50 mg L$^{-1}$ for spectinomycin and 7 mg L$^{-1}$ for chloramphenicol, respectively. *Synechococcus* sp. PCC 7002 was grown in A$^+$ medium for general maintenance purpose. All strains and plasmids used in this study are listed in Table S2.

Construction of recombinant plasmids. All enzymes and cloning kits were purchased from New England Biolabs, MA, USA, unless otherwise specified. Kits for DNA purification were purchased from Qiagen, MD, USA. Plasmid pPB305 was constructed by PCR amplification of the DNA fragments of sll1077U, sll1077D, and cat, and Gibson Assembly into plasmid pBlueScript II SK (+) which was digested with KpnI and SacI. The DNA fragment containing gene sll1077 was PCR amplified from the genomic DNA of *Synechocystis* 6803 and inserted between the NdeI and XhoI restriction sites on pET30a(+), so that Sll1077 will be tagged with 6×His, resulting in plasmid pPB300. pPB306 was constructed by PCR amplifying sll1077-His from pPB300 and inserting it between the NdeI and SalI restriction sites on pSCPTH (Wang, 2013) using Gibson Assembly Kit. pPB306d was constructed by deleting the lac promoter region on the pBluescript vector backbone via digesting pPB306 with SacI and SapI restriction enzymes and then blunt-ended using T4 DNA polymerase and self-ligated using Quick DNA ligase. pPB307, pPB308, pPB309, pPB310, pPB311 were constructed by replacing the RBS in pPB306d using the Site Directed Mutagenesis Kit. pPB312 was constructed by deleting the "CTCGAG" (XhoI) nucleotides between the sll1077 coding sequence and the 6×His tag on plasmid pPB309. pPB316 was constructed by inserting the rrnBT1T2 terminator (from *E. coli* NEB5a) downstream of sll1077 on pPB312. pPB312 was digested with SalI, dephosphorylated and then assembled with the terminator rrnBT1T2 using Gibson Assembly Kit. pPB313 was constructed by deleting the 6×His tag and "CTCGAG" (XhoI) between the sll1077 coding sequence and stop codon TAA of pPB309. pPB317 was constructed by inserting rrnBT1T2 downstream of sll1077 on pPB313, which was digested with SalI and dephosphorylated, using the Gibson Assembly Kit. Plasmid To express the efe gene in *Synechococcus* 7942, 1.43 kb of the BbvCI/XhoI fragment containing psbAp::efe-FLAG from pJU158 was blunt-ended and ligated to the SmaI site of the neutral site 1 vector pAM1303, resulting in pEFE-FLAG-NS1. To overexpress the sll1077 gene in *Synechococcus* 7942, 1.69 kb of the BamHI/SalI fragment harboring the sll1077 expression cassette from pPB317 was cloned into the BamHI/SalI site of a neutral site 4-targeting vector pCX0104-LuxAB-FT to generate pGD7942-NS4. The DNA sequence of genes of interest were all conformed by DNA sequencing. Primers used in constructing all plasmids are detailed in Table 2.

TABLE 2

Strains and plasmids used

| | Genotype or features | Sources |
|---|---|---|
| Strains | | |
| NEB5α | fhuA2 Δ(argF-lacZ)U169 phoA gln V44 Φ80 Δ(lacZ)M15 gyrA96 recA1 relA1 endA1 thi-1 hsdR17 | NEB |
| *Synechocystis* sp. PCC 6803 | Wild-type | ATCC |
| *Synechocystis* PB805W | Δsll1077 in *Synechocystis* sp. PCC 6803 | This study |
| *Synechocystis* PB806W | Overexpression (OE) of slr1077-His in *Synechocystis* sp. PCC 6803; inserted between slr1495 and sll1397 | This study |
| *Synechocystis* PB807W | OE of sll1077-His in *Synechocystis* sp. PCC 6803 | This study |
| *Synechocystis* PB808W | OE of sll1077-His in *Synechocystis* sp. PCC 6803 | This study |
| *Synechocystis* PB809W | OE of sll1077-His in *Synechocystis* sp. PCC 6803 | This study |
| *Synechocystis* PB810W | OE of sll1077-His in *Synechocystis* sp. PCC 6803 | This study |
| *Synechocystis* PB811W | OE of sll1077-His in *Synechocystis* sp. PCC 6803 | This study |
| *Synechocystis* PB812W | OE of sll1077-His in *Synechocystis* sp. PCC 6803 | This study |
| *Synechocystis* PB816W | OE of sll1077-His in *Synechocystis* sp. PCC 6803 | This study |
| *Synechocystis* PB817W | OE of sll1077-His in *Synechocystis* sp. PCC 6803 | This study |
| *Synechocystis* PB752 | OE of efe in *Synechocystis* sp. PCC 6803; inserted at the slr0168 neutral site | 1 |
| *Synechocystis* PB816H | OE of and sll1077-His in *Synechocystis* PB752 | This study |
| *Synechocystis* PB817H | OE of sll1077 in *Synechocystis* PB752 | This study |
| *Synechococcus* sp. PCC 7002 | Wild-type | In Lab |
| *Synechococcus elongatus* PCC 7942 | Wild-type | In Lab |

TABLE 2-continued

Strains and plasmids used

| | Genotype or features | Sources |
|---|---|---|
| Synechococcus elongatus EFE7942 | OE of efe in Synechococcus elongatus PCC 7942; inserted at neutral site 1, i.e., "Synpcc7942_2498" | This study |
| Synechococcus elongatus GD44 | OE of sll1077 in Synechococcus elongatus PCC 7942; inserted at neutral site 4, i.e., "Synpcc7942_0103" | This study |
| Synechococcus elongatus GD-EFE7942 | OE of sll1077 and efe in Synechococcus elongatus PCC 7942 | This study |
| Plasmids | | |
| pBluescript II SK (+) | $Amp^R$, pUC ori | Stratagene |
| pPB305 | sll1077U-$Cm^R$-sll1077D, inserted to the pBluescript II SK (+) vector backbone | This study |
| pPB306 | slr1495-$Cm^R$-$P_{tac}$-RBSv306-sll1077-His-sll1397, inserted to the pBluescript II SK (+) vector backbone | This study |
| pPB307 | Derivative of pPB306; RBSv306 replaced by RBSv307 | This study |
| pPB308 | Derivative of pPB306; RBSv307 replaced by RBSv308 | This study |
| pPB309 | Derivative of pPB306; RBSv306 replaced by RBSv309 | This study |
| pPB310 | Derivative of pPB306; RBSv306 replaced by RBSv310 | This study |
| pPB311 | Derivative of pPB306; RBSv306 replaced by RBSv311 | This study |
| pPB312 | Derivative of pPB309; XhoI site between sll1077 and His deleted | This study |
| pPB316 | Derivative of pPB312; rrnB terminator added downstream of sll1077-His | This study |
| pPB317 | Derivative of pPB316; His tag removed from downstream of sll1077 | This study |
| pJU158 | slr0168-$P_{psbA}$-RBSv4-efe-$T_{T7}$-$Sm^R$-slr0168, pUC ori | 2 |
| pEFE-FLAG-NS1 | NS1Up-$Sm^R$-$P_{psbA}$-RBSv4-efe-$T_{T7}$-NS1Dn | This study |
| pCX0104-LuxAB-FT | $Zn^{++}$-inducible expression of $P_{smtA}$::luxAB::3×FLAG targeted to NS4 ($Cm^R$) | 3 |
| pGD6803-NS4 | NS4Dn-$P_{tac}$-RBSv309-sll1077-$T_{rrnB}$-$Cm^R$-NS4Up | This study |

Genome engineering of cyanobacteria. Transformation of Synechocystis was accomplished via natural transformation as described previously. Briefly, the wild-type Synechocystis 6803 strain was grown in mBG11 medium until the $OD_{730}$ reached approximately 0.4. Then, 2.5 mL of culture was condensed to about 0.2 mL via centrifugation and resuspension with the same culture medium. Cells were transferred into a 1.5 mL Eppendorf tube and mixed with 1-2 μg DNA of integration plasmid. The sample was incubated under low light for about 5 hours, and mixed once in the middle of the incubation. Cells were then spread onto BG11 plates supplemented with appropriate antibiotics. Strains PB805W-PB812W, PB816W, PB817W were constructed by transforming wild-type Synechocystis 6803 with integration plasmids pPB305-pPB312, pPB316 and pPB317. Strains PB816H and PB817H were constructed by transforming an efe-expressing strain, Synechocystis PB752, with the integration plasmids pPB316 and pPB317, respectively. Transformation of Synechococcus 7942 was completed following a previously established protocol. Transformation of Synechococcus 7942 with integration plasmids pEFE-FLAG-NS1 or pGD7942-NS4 resulted in strain EFE7942 and GD7942, respectively. The efe expression cassette was PCR amplified from the genomic DNA of EFE7942 strain using primers NS15 and NS16, and inserted into the neutral site 1 of the genome of Synechococcus GD7942, resulting in strain GD-EFE7942. The complete segregation of genomes was verified via colony PCR, followed by DNA sequencing of the PCR products amplified using primers (listed in Table 3) flanking the modified regions of the cyanobacterial genomes.

TABLE 3

Primers used

| Plasmids | Primers | Seq ID no. | DNA sequences | Target | Template source |
|---|---|---|---|---|---|
| pPB305 | Sll1077U3 | SEQ ID NO: 10 | GGGCGAATTGGGTACCggagtttcggttaag tctaag (KpnI) | Sll1077U | S6803 gDNA |
| | Sll1077U4 | SEQ ID NO: 11 | CACAGGTATCTGCAGaggtagttactagctaa acaac | Sll1077U | S6803 gDNA |
| | Sll1077D3 | SEQ ID NO: 12 | GAAGCAGTGTGGGATCCTagtaactttaact tgactaattattgc | Sll1077D | S6803 gDNA |
| | Sll1077D4 | SEQ ID NO: 13 | GAACAAAAGCTGGAGCTCcgagcagaacag ttttacc (SacI) | Sll1077D | S6803 gDNA |
| | CatU3 | SEQ ID NO: 14 | gtaactacctCTGCAGATACCTGTGACGGA AGATCAC | cat | pACYC184 |
| | CatD4 | SEQ ID NO: 15 | aaagttactAGGATCCCACACTGCTTCCGG TAGTC | cat | pACYC184 |
| pPB300 | sll1077U1 | SEQ ID NO: 16 | agatataCATATGagcgatgccaccccgtttc | sll1077 | S6803 gDNA |
| | sll1077D2 | SEQ ID NO: 17 | ggtgCTCGAGttgccagggctcatccactg | sll1077 | S6803 gDNA |

TABLE 3-continued

Primers used

| Plasmids | Primers | Seq ID no. | DNA sequences | Target | Template source |
|---|---|---|---|---|---|
| pPB306 | sll1077U3 | SEQ ID NO: 18 | CAATTTCACACAAggaggatataCATATGag cgatgccaccccgtttc | sll1077 | pPB300 |
|  | sll1077-His-D4 | SEQ ID NO: 19 | caattcgcactgaatctccaGTCGACGTTAGCA GCCGGATCTTAGTG | sll1077 | pPB300 |
| pPB307 | TACR4 | SEQ ID NO: 20 | GTGTGAAATTGTTATCCGCTCAC | RBS of pPB306d | pPB306d |
|  | sll1077U307 | SEQ ID NO: 21 | AAGGAGGAAACATatgagcgatgccaccccgt ttc | RBS of pPB306d | pPB306d |
| pPB308 | TACR4 | SEQ ID NO: 22 | GTGTGAAATTGTTATCCGCTCAC | RBS of pPB306d | pPB306d |
|  | sll1077U308 | SEQ ID NO: 23 | AAGGAGGAACAGCatgagcgatgccaccccg tttc | RBS of pPB306d | pPB306d |
| pPB309 | TACR4 | SEQ ID NO: 24 | GTGTGAAATTGTTATCCGCTCAC | RBS of pPB306d | pPB306d |
|  | sll1077U309 | SEQ ID NO: 25 | AAGGAGGAAACAGCatgagcgatgccaccccgt ttc | RBS of pPB306d | pPB306d |
| pPB310 | TACR4 | SEQ ID NO: 26 | GTGTGAAATTGTTATCCGCTCAC | RBS of pPB306d | pPB306d |
|  | sll1077U327 | SEQ ID NO: 27 | AAGAAGGAGAAACAGCatgagcgatgccac cccgtttc | RBS of pPB306d | pPB306d |
| pPB311 | TACR4 | SEQ ID NO: 28 | GTGTGAAATTGTTATCCGCTCAC | RBS of pPB306d | pPB306d |
|  | sll1077U311 | SEQ ID NO: 29 | AAGAAGGAGAAACATAGCatgagcgatgcc accccgtttc | RBS of pPB306d | pPB306d |
| pPB312 | sll1077C-F-3xHis | SEQ ID NO: 30 | CACCACCACTAAGATCCGGCTG | sll1077- His | pPB309 |
|  | sll1077C-R-3xHis | SEQ ID NO: 31 | GTGGTGGTGttgccagggctcatccactg | sll1077- His | pPB309 |
| pPB313 | sll1077C-F-TAA | SEQ ID NO: 32 | TAAGATCCGGCTGCTAAC | sll1077 | pPB309 |
|  | sll1077C-R | SEQ ID NO: 33 | TTAttgccagggctcatc | sll1077 | pPB309 |
| pPB316 | Primer rrnBU-sll1077 | SEQ ID NO: 34 | TAAGATCCGGCTGCTAAC░░░░░░░░░░░░░░░░░░░░░░░░░░ | rrnBT1T2 | E. coli NEB5α gDNA |
|  | Primer rrnBD-SL1 | SEQ ID NO: 35 | caattcgcactgaatctccaGTCGACcaggaaga gtttgtagaaacg | rrnBT1T2 | E. coli NEB5α gDNA |
| pPB317 | Primer rrnBU-sll1077 | SEQ ID NO: 36 | TAAGATCCGGCTGCTAAC░░░░░░░░░░░░░░░░░░░░░░░░░░ | rrnBT1T2 | E. coli NEB5α gDNA |
|  | Primer rrnBD-SL1 | SEQ ID NO: 37 | caattcgcactgaatctccaGTCGACcaggaaga gtttgtagaaacg | rrnBT1T2 | E. coli NEB5α gDNA |
| pEFE-FLAG-NS1 |  |  | Blunt end cloning; no primers used |  | pJU158 |
| pGD7942-NS4 |  |  | Blunt end cloning; no primers used |  | pPB317 |

TABLE 3-continued

Primers used

| Plasmids | Primers | Seq ID no. | DNA sequences | Target | Template source |
|---|---|---|---|---|---|
| Following primers were used to verify mutation at the slr0168 neutral site of genome of Synechocystis 6803 | | | | | |
| | US168e1 | SEQ ID NO: 38 | CAAGAGTAGTTCCCTCAACAC | | |
| | US168e2 | SEQ ID NO: 39 | CTGAAGGGATTACGCAATAC | | |
| Following primers were used to verify the mutation at the slr1495-sll1397 neutral site of genome of Synechocystis 6803 | | | | | |
| | VF1a | SEQ ID NO: 40 | GTC TCC AGG ATG CGT AAC | | |
| | VR1a | SEQ ID NO: 41 | CGA TGC AAG ATT GAT AGA CAG AG | | |
| Following primers were used to verify the mutation at the sll1077 site of genome of Synechocystis 6803 | | | | | |
| | Sll1077e1 | SEQ ID NO: 42 | ggcaattgttgattgagttg | | |
| | Sll1077e2 | SEQ ID NO: 43 | gaggtgaatcttggtgatttg | | |
| Following primers were used to verify the mutation at the neutral site 1, i.e., "Synpcc7942_2498" site, of genome of S. elongatus PCC 7942 | | | | | |
| | NS13 | SEQ ID NO: 44 | GTGCAGCAGCAACTTCAAG | | |
| | NS14 | SEQ ID NO: 45 | GTGCGTTCCACAGACATC | | |
| | NS15 | SEQ ID NO: 46 | GGCTGCTTGGCAAAAAC | | |
| | NS16 | SEQ ID NO: 47 | CCTGTTGTGCTGTTTCGATTG | | |
| Following primers were used to verify the mutation at neutral site 4, i.e., "Synpcc7942_0103" site, of genome of S. elongatus PCC 7942 | | | | | |
| | 5'NS4 | SEQ ID NO: 48 | tcttgctctgacgccttattc | | |
| | 3'NS4 | SEQ ID NO: 49 | atcgtcccaagatccagaatgt | | |

SDS-PAGE and Western blotting. A protocol from a previous study was used. Briefly, when the $OD_{730}$ of cyanobacterial culture reached 0.5-1.0, approximately 5 $OD_{730}$·mL (i.e., 10 mL if the $OD_{730}$ of the culture equals 0.5) of cells were collected via centrifugation at 3220×g, 24° C. for 5 min and removal of supernatants. The cell pellets were stored at −80° C. until use. Upon running SDS-PAGE, cells were resuspended with 0.5 mL of cold 0.1 M potassium phosphate buffer (pH7.0) supplemented with DTT (0.2 mM) and Halt Protein Inhibitor Cocktail (Thermno Fisher Scientific, MA, USA), and mixed with 0.2 g 0.1-mm-diameter acid-washed glass beads, and then subjected to bead-beating at 4° C. for 5 minutes using the Digital Disruptor Genie (Scientific Industries, Inc., NY, USA). The cell lysate was centrifuged at 4° C., 18000×g for 10 min, and then the supernatant containing soluble proteins was transferred into a new Eppendorf tube placed on ice. The protein concentrations were estimated using the Bradford assay (Thermno Fisher Scientific, MA, USA). Then, 2.5 µg protein from each sample was mixed with 2×SDS-PAGE sample buffer (950 µl BioRad 2× Laemmli Sample Buffer+50 µl BME) in a PCR tube and incubated at 99° C. for 5 min using a thermocycler. Samples were then loaded onto Mini-PROTEAN® TGX Stain-Free™ precast gels (Bio-Rad Laboratories, CA, USA), and electrophoresis was conducted at 150 V for about 45 min. Gels were imaged using UV excitation in a FluorChem Q imager (ProteinSimple, CA, USA).

Western blotting was conducted using Pierce G2 Fast Blotter (Thermo Fisher Scientific, MA, USA). HisProbe™-HRP Conjugate (Thermo Fisher Scientific, MA, USA) was used as the antibody (at 1:500 dilution) to detect the Sll1077-His. The chemiluminescent blots were imaged using FluorChem Q imager (ProteinSimple, CA, USA).

In vitro enzyme activity assay. His-tagged Sll1077 i.e., Sll1077-His, was first purified from Synechocystis PB816W. PB816W was grown in 250 mL mBG11 medium under 50 µE m$^{-2}$ s$^{-1}$ until an $OD_{730}$ of about 3, and then cells were harvested via centrifugation at 3220×g, 24° C. for 10 min followed by removal of supernatants. The cell pellets were stored at −80° C. Cells were subsequently resuspended with 10 mL of cold 0.1 M potassium phosphate buffer (pH7.0) supplemented with DTT (0.2 mM) and Halt Protein Inhibitor Cocktail (Thermo Fisher Scientific, MA, USA), and lysed by sonication in an ice-water bath using a Q500 Sonicator (Qsonica L.L.C, CT, USA) programed for 100 cycles of 3-sec-on-3-sec-off at an amplitude of 20%. The cell lysate was centrifuged at 4° C., 8000× g for 10 min, and then the supernatant containing soluble proteins was run through His GraviTrap (GE Healthcare) to purify Sll1077-His following the user manual. Briefly, the purification column containing 1-mL Ni sepharose was first equilibrated with 10 mL binding buffer (20 mM sodium phosphate, 500 mM NaCl, 45 mM imidazole, pH 7.4), and then was loaded with the approximately 10 mL cleared cell lysate. After all of the lysate went through the Ni sepharose, the sepharose was washed twice, with 10 mL and 5 mL of the binding buffer, respectively. Ultimately, 3 mL elution buffer (20 mM sodium phosphate, 500 mM NaCl, 500 mM imidazole, pH 7.4) was applied to the purification column to elute Sll1077-His.

0.4 mL purified Sll1077-His (3.5 mg mL$^{-1}$) was mixed with 30 μL guanidine (1 M) dissolved in 5.6 mL reaction buffer (the same as the above binding buffer). As a control, 0.7 mL BSA (2 mg mL$^{-1}$) was mixed with 30 μL guanidine (1M) dissolved in 5.3 mL reaction buffer. The reaction mixtures were incubated on a rotary shaker at 30° C. for 12 hours. Subsequently, the samples were passed through 30-kD membrane via centrifugation at 5000×g, 24° C., and 1.5 mL flow-through was freeze-dried under cryogenic vacuum. To detect urea in the samples, the dried samples were derivatized via reacting with 70 μL of MTBSTFA+1% TBDMCS (Regis Technologies, Inc.) at 70° C. for 30 min. The derivatized samples were centrifuge at 17000× g, room temperature for 5 min, and then 1 μL the supernatants were analyzed on GC-MS using a method known in the art.

Guanidine tolerance and degradation test. For guanidine tolerance test, cyanobacterial strains were grown in 20 mL mBG11 medium supplemented with 0-1 mM guanidine and 50 mM NaHCO$_3$. For guanidine degradation test, cyanobacterial strains were grown in 10 mL mBG11 free of nitrate while supplemented with 50 mM NaHCO$_3$ and 5 mM or 1 mM guanidine chloride, under constant light of 50 μE m$^{-2}$ s$^{-1}$ on a rotary shaker at 150 rpm and 30° C. Every day, 1 mL of culture was sampled for reading OD$_{730}$ and then transferred into an Eppendorf tube and centrifuged at 17000×g at room temperature for 2 min. The supernatants were stored at −20° C. for later analysis of guanidine.

Production of ethylene from engineered *Synechococcus elongatus*. The *Synechococcus elongatus* EFE7942, GD-EFE7942 and WT (a negative control) were grown in mBG11 supplemented with 10 mM HEPES-NaOH (pH8.2) and 20 mM NaHCO$_3$ at 35° C. until OD$_{730}$ reached approximately 1.0. Subsequently, each strain was inoculated into 50 mL fresh medium with an initial OD$_{730}$ of about 0.05, and grown under continuous light of 100 μE m$^{-2}$ s$^{-1}$ at 30° C. aerated with 1% CO$_2$ at a rate of 50 mL min$^{-1}$. Every day, 2 mL culture was sampled for ethylene productivity assay, measurement of OD$_{730}$ and guanidine analysis. After every three days of cultivation, appropriate volumes of cultures were centrifuged and resuspended with 50 mL fresh medium to an initial OD$_{730}$ of about 0.05.

Quantification of guanidine. Guanidine was quantified using a previously established method. Briefly, guanidine hydrochloride (Cat. #G4505, Sigma-Aldrich, USA) was used to prepare standard solutions, and standards and filtrated culture samples (via passing through 0.2 μm diameter membrane filters) were analyzed using an Agilent 1200 Series HPLC (Agilent, USA) equipped with a Multi-Wavelength Detector and a set of Dionex IonPac™ CS14 cation-exchange guard (4 mm×50 mm) and analytical columns (4 mm×250 mm; Thermo Fisher Scientific, MA, USA). The column temperature was held at 30° C. The mobile phase was 3.75 mM methanesulfonic acid, with a constant flow rate of 1.0 mL/min for 30 min. Sample injection volume was 100 μL. Guanidine was quantified via monitoring the absorbance at 195 nm.

Measurement of ethylene produced from cyanobacteria. 1 mL cyanobacterial culture was transferred into a 17-mL glass test tube, sealed immediately with rubber stopper, and incubated under 100 μE m$^{-2}$ s$^{-1}$ at 30° C. with shaking. After 3 h incubation, 250 μL gas was sampled from the headspace of the test tube using a sample-lock syringe and injected into the Shimadzu GC-2010 system equipped with a flame ionization detector (FID) and a RESTEK column (length, 30.0 m; inner diameter, 0.32 mm; film thickness, 5 μm). The GC-FID was operated under the following conditions: carrier gas, helium; inlet temperature, 200° C.; split ratio, 25; inlet total flow, 40.4 mL/min; Pressure, 79 kPa; column flow, 1.53 mL/min; linear velocity, 32.1 cm/see (Flow Control Mode); purge flow, 0.5 mL/min; column temperature, 130° C.; equilibration time, 2 min; hold time, 2 min; FID temperature, 200° C.; sampling rate, 40 msec; stop time, 2 min; FID makeup gas, He; FID makeup flow, 30 mL/min; H2 flow, 40 mL/min; air flow: 400 mL/min.

Shotgun proteomics. *Synechocystis* 6803 and the ethylene-producing JU547 were inoculated into 3×50 mL mBG11 with an initial OD$_{730}$ of 0.1. When OD$_{730}$ reached about 0.5, 60 OD$_{730}$-mL cells were collected via centrifugation at 3220×g, 4° C. for 5 min. The cell pellets were washed with 25 mL cold wash buffer (50 mM Tris-HCl, pH8.0 and 10 mM CaCl$_2$)) and centrifuged again, followed by washing with 20 mL and 1 mL washing buffer. The supernatants were discarded and cells were frozen at −80° C. Three biological replicates were included for each strain. Comparative proteomic analyses of *Synechocystis* 6803 and JU547 was conducted following our previously published method 43. The sample preparation and amount of peptide loaded to the capillary column varied from that in the previous method. Briefly, cell pellets taken out of −80° C. were lysed by sonication with a program of 12 cycles of 10 seconds-on-2-minutes-off on ice. The supernatants were collected via centrifugation and the protein concentrations were analyzed using Bradford assay (Thermo Scientific, Rockford, IL). Then, 75 μg of total protein for each sample was used for downstream proteomic sample.

Guanidine is a natural metabolite present in bacteria and human bodies. It is unknown to us whether its accumulation or deficiency may cause health issues. In agriculture/aquaculture, guanidine is a potential slow-release nitrogen fertilizer that could help increase fertilizer utilization efficiency and reduce fertilizer run-off. In biotechnology, guanidine is a co-product with ethylene from the ethylene-forming enzyme reaction. In environmental remediation, guanidine is a soil contaminant at military sites.

In an embodiment the engineered strains disclosed herein are useful for bioethylene production. In an embodiment, the guanidine degradation enzyme could help enhance ethylene productivity and nitrogen fertilizer use efficiency via recycling of nitrogen locked in the co-product guanidine.

In an embodiment the engineered strains disclosed herein are useful for the utilization of nitrogen fertilizer. Currently the utilization of nitrogen fertilizers is inefficient, with about ¼ of the nitrogen absorbed by plants, and the rest lost to the atmosphere or to run-off causing aquatic environment eutrophication.

In an embodiment the engineered strains disclosed herein are useful for soil decontamination of guanidine. Currently the contaminated soil is burned with methane to degrade guanidine. The process is energy intensive and may generate other toxins.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A non-naturally occurring *Synechocystis* or *Synechococcus* cyanobacterial strain engineered to express a heterologous bacterial ethylene-forming enzyme (EFE) and a guanidine degradation enzyme.

2. The non-naturally occurring cyanobacterial strain of claim 1 wherein the guanidine degradation enzyme is encoded by sll1077.

3. The non-naturally occurring cyanobacterial strain of claim 1 comprising improved cell growth in a solution containing guanidine compared to a naturally occurring cyanobacterial strain.

4. The non-naturally occurring cyanobacterial strain of claim 1 wherein the cyanobacterial strain is selected from the group consisting of *Synechocystis* PB816H, *Synechocystis* PB817H and *Synechococcus elongatus* GD.

5. The non-naturally occurring cyanobacterial strain of claim 1 wherein the strain is capable of ethylene production.

6. The non-naturally occurring cyanobacterial strain of claim 1 wherein the strain is capable of guanidine degradation.

7. A method for guanidine degradation comprising the step of exposing the non-naturally occurring cyanobacterial strain of claim 1 to a solution containing guanidine.

* * * * *

SEQUENCE LISTING

```
<160> NUMBER OF SEQ ID NOS: 40

<210> SEQ ID NO 1
<211> LENGTH: 37
<212> TYPE: DNA
<213> ORGANISM: Artificial Sequence
<220> FEATURE:
<223> OTHER INFORMATION: primer Sll1077U3

<400> SEQUENCE: 1
gggcgaattg ggtaccggag tttcggttaa gtctaag                              37

<210> SEQ ID NO 2
<211> LENGTH: 37
<212> TYPE: DNA
<213> ORGANISM: Artificial Sequence
<220> FEATURE:
<223> OTHER INFORMATION: primer Sll1077U4

<400> SEQUENCE: 2
cacaggtatc tgcagaggta gttactagct aaacaac                              37

<210> SEQ ID NO 3
<211> LENGTH: 45
<212> TYPE: DNA
<213> ORGANISM: Artificial Sequence
<220> FEATURE:
<223> OTHER INFORMATION: primer Sll1077D3

<400> SEQUENCE: 3
gaagcagtgt gggatcctag taactttaac ttgactaatt attgc                     45

<210> SEQ ID NO 4
<211> LENGTH: 37
<212> TYPE: DNA
<213> ORGANISM: Artificial Sequence
<220> FEATURE:
<223> OTHER INFORMATION: primer Sll1077D4

<400> SEQUENCE: 4
gaacaaaagc tggagctccg agcagaacag ttttacc                              37

<210> SEQ ID NO 5
<211> LENGTH: 37
<212> TYPE: DNA
<213> ORGANISM: Artificial Sequence
<220> FEATURE:
<223> OTHER INFORMATION: primer CatU3

<400> SEQUENCE: 5
gtaactacct ctgcagatac ctgtgacgga agatcac                              37

<210> SEQ ID NO 6
<211> LENGTH: 35
<212> TYPE: DNA
<213> ORGANISM: Artificial Sequence
<220> FEATURE:
<223> OTHER INFORMATION: primer CatD4

<400> SEQUENCE: 6
```
aaagttacta ggatcccaca ctgcttccgg tagtc                                    35

<210> SEQ ID NO 7
<211> LENGTH: 32
<212> TYPE: DNA
<213> ORGANISM: Artificial Sequence
<220> FEATURE:
<223> OTHER INFORMATION: primer sll1077U1

<400> SEQUENCE: 7
agatatacat atgagcgatg ccaccccgtt tc                                       32

<210> SEQ ID NO 8
<211> LENGTH: 30
<212> TYPE: DNA
<213> ORGANISM: Artificial Sequence
<220> FEATURE:
<223> OTHER INFORMATION: primer sll1077D2

<400> SEQUENCE: 8
ggtgctcgag ttgccagggc tcatccactg                                          30

<210> SEQ ID NO 9
<211> LENGTH: 48
<212> TYPE: DNA
<213> ORGANISM: Artificial Sequence
<220> FEATURE:
<223> OTHER INFORMATION: primer sll1077U3

<400> SEQUENCE: 9
caatttcaca caaggaggat atacatatga gcgatgccac cccgtttc                      48

<210> SEQ ID NO 10
<211> LENGTH: 47
<212> TYPE: DNA
<213> ORGANISM: Artificial Sequence
<220> FEATURE:
<223> OTHER INFORMATION: primer sll1077-His-D4

<400> SEQUENCE: 10
caattcgcac tgaatctcca gtcgacgtta gcagccggat cttagtg                       47

<210> SEQ ID NO 11
<211> LENGTH: 23
<212> TYPE: DNA
<213> ORGANISM: Artificial Sequence
<220> FEATURE:
<223> OTHER INFORMATION: primer TACR4

<400> SEQUENCE: 11
gtgtgaaatt gttatccgct cac                                                 23

<210> SEQ ID NO 12
<211> LENGTH: 35
<212> TYPE: DNA
<213> ORGANISM: Artificial Sequence
<220> FEATURE:
<223> OTHER INFORMATION: primer sll1077U307

<400> SEQUENCE: 12
aaggaggaaa catatgagcg atgccacccc gtttc                                    35

<210> SEQ ID NO 13
<211> LENGTH: 23
<212> TYPE: DNA
<213> ORGANISM: Artificial Sequence

```
<220> FEATURE:
<223> OTHER INFORMATION: primer TACR4

<400> SEQUENCE: 13
gtgtgaaatt gttatccgct cac                                              23

<210> SEQ ID NO 14
<211> LENGTH: 35
<212> TYPE: DNA
<213> ORGANISM: Artificial Sequence
<220> FEATURE:
<223> OTHER INFORMATION: primer sll1077U308

<400> SEQUENCE: 14
aaggaggaac agcatgagcg atgccacccc gtttc                                 35

<210> SEQ ID NO 15
<211> LENGTH: 23
<212> TYPE: DNA
<213> ORGANISM: Artificial Sequence
<220> FEATURE:
<223> OTHER INFORMATION: primer TACR4

<400> SEQUENCE: 15
gtgtgaaatt gttatccgct cac                                              23

<210> SEQ ID NO 16
<211> LENGTH: 35
<212> TYPE: DNA
<213> ORGANISM: Artificial Sequence
<220> FEATURE:
<223> OTHER INFORMATION: primer sll1077U309

<400> SEQUENCE: 16
aaggagaaac agcatgagcg atgccacccc gtttc                                 35

<210> SEQ ID NO 17
<211> LENGTH: 23
<212> TYPE: DNA
<213> ORGANISM: Artificial Sequence
<220> FEATURE:
<223> OTHER INFORMATION: primer TACR4

<400> SEQUENCE: 17
gtgtgaaatt gttatccgct cac                                              23

<210> SEQ ID NO 18
<211> LENGTH: 38
<212> TYPE: DNA
<213> ORGANISM: Artificial Sequence
<220> FEATURE:
<223> OTHER INFORMATION: primer sll1077U310

<400> SEQUENCE: 18
aagaaggaga aacagcatga gcgatgccac cccgtttc                              38

<210> SEQ ID NO 19
<211> LENGTH: 23
<212> TYPE: DNA
<213> ORGANISM: Artificial Sequence
<220> FEATURE:
<223> OTHER INFORMATION: primer TACR4

<400> SEQUENCE: 19
gtgtgaaatt gttatccgct cac                                              23
```

<210> SEQ ID NO 20
<211> LENGTH: 40
<212> TYPE: DNA
<213> ORGANISM: Artificial Sequence
<220> FEATURE:
<223> OTHER INFORMATION: primer sll1077U311

<400> SEQUENCE: 20
aagaaggaga aacatagcat gagcgatgcc accccgtttc                              40

<210> SEQ ID NO 21
<211> LENGTH: 22
<212> TYPE: DNA
<213> ORGANISM: Artificial Sequence
<220> FEATURE:
<223> OTHER INFORMATION: primer sll1077C-F-3xHis

<400> SEQUENCE: 21
caccaccact aagatccggc tg                                                 22

<210> SEQ ID NO 22
<211> LENGTH: 29
<212> TYPE: DNA
<213> ORGANISM: Artificial Sequence
<220> FEATURE:
<223> OTHER INFORMATION: primer sll1077C-R-3xHis

<400> SEQUENCE: 22
gtggtggtgt tgccagggct catccactg                                          29

<210> SEQ ID NO 23
<211> LENGTH: 18
<212> TYPE: DNA
<213> ORGANISM: Artificial Sequence
<220> FEATURE:
<223> OTHER INFORMATION: primer sll1077C-F-TAA

<400> SEQUENCE: 23
taagatccgg ctgctaac                                                      18

<210> SEQ ID NO 24
<211> LENGTH: 18
<212> TYPE: DNA
<213> ORGANISM: Artificial Sequence
<220> FEATURE:
<223> OTHER INFORMATION: primer sll1077C-R

<400> SEQUENCE: 24
ttattgccag ggctcatc                                                      18

<210> SEQ ID NO 25
<211> LENGTH: 48
<212> TYPE: DNA
<213> ORGANISM: Artificial Sequence
<220> FEATURE:
<223> OTHER INFORMATION: primer rrnBU-sll1077

<400> SEQUENCE: 25
taagatccgg ctgctaacaa gcttgcctga tacagattaa atcagaac                     48

<210> SEQ ID NO 26
<211> LENGTH: 47
<212> TYPE: DNA
<213> ORGANISM: Artificial Sequence
<220> FEATURE:
<223> OTHER INFORMATION: primer rrnBD-SL1

<400> SEQUENCE: 26
caattcgcac tgaatctcca gtcgaccagg aagagtttgt agaaacg                47

<210> SEQ ID NO 27
<211> LENGTH: 48
<212> TYPE: DNA
<213> ORGANISM: Artificial Sequence
<220> FEATURE:
<223> OTHER INFORMATION: primer rrnBU-sll1077

<400> SEQUENCE: 27
taagatccgg ctgctaacaa gcttgcctga tacagattaa atcagaac               48

<210> SEQ ID NO 28
<211> LENGTH: 47
<212> TYPE: DNA
<213> ORGANISM: Artificial Sequence
<220> FEATURE:
<223> OTHER INFORMATION: primer rrnBD-SL1

<400> SEQUENCE: 28
caattcgcac tgaatctcca gtcgaccagg aagagtttgt agaaacg                47

<210> SEQ ID NO 29
<211> LENGTH: 21
<212> TYPE: DNA
<213> ORGANISM: Artificial Sequence
<220> FEATURE:
<223> OTHER INFORMATION: primer US168e1

<400> SEQUENCE: 29
caagagtagt tccctcaaca c                                            21

<210> SEQ ID NO 30
<211> LENGTH: 20
<212> TYPE: DNA
<213> ORGANISM: Artificial Sequence
<220> FEATURE:
<223> OTHER INFORMATION: primer US168e2

<400> SEQUENCE: 30
ctgaagggat tacgcaatac                                              20

<210> SEQ ID NO 31
<211> LENGTH: 19
<212> TYPE: DNA
<213> ORGANISM: Artificial Sequence
<220> FEATURE:
<223> OTHER INFORMATION: primer VF1a

<400> SEQUENCE: 31
gtctccagga tgcgttaac                                               19

<210> SEQ ID NO 32
<211> LENGTH: 23
<212> TYPE: DNA
<213> ORGANISM: Artificial Sequence
<220> FEATURE:
<223> OTHER INFORMATION: primer VR1a

<400> SEQUENCE: 32
cgatgcaaga ttgatagaca gag                                          23

<210> SEQ ID NO 33

-continued

```
<211> LENGTH: 20
<212> TYPE: DNA
<213> ORGANISM: Artificial Sequence
<220> FEATURE:
<223> OTHER INFORMATION: primer Sll1077e1

<400> SEQUENCE: 33
ggcaattgtt gattgagttg                                                  20

<210> SEQ ID NO 34
<211> LENGTH: 21
<212> TYPE: DNA
<213> ORGANISM: Artificial Sequence
<220> FEATURE:
<223> OTHER INFORMATION: primer Sll1077e2

<400> SEQUENCE: 34
gaggtgaatc ttggtgattt g                                                21

<210> SEQ ID NO 35
<211> LENGTH: 19
<212> TYPE: DNA
<213> ORGANISM: Artificial Sequence
<220> FEATURE:
<223> OTHER INFORMATION: primer NS13

<400> SEQUENCE: 35
gtgcagcagc aacttcaag                                                   19

<210> SEQ ID NO 36
<211> LENGTH: 18
<212> TYPE: DNA
<213> ORGANISM: Artificial Sequence
<220> FEATURE:
<223> OTHER INFORMATION: primer NS14

<400> SEQUENCE: 36
gtgcgttcca cagacatc                                                    18

<210> SEQ ID NO 37
<211> LENGTH: 17
<212> TYPE: DNA
<213> ORGANISM: Artificial Sequence
<220> FEATURE:
<223> OTHER INFORMATION: primer NS15

<400> SEQUENCE: 37
ggctgcttgg caaaaac                                                     17

<210> SEQ ID NO 38
<211> LENGTH: 21
<212> TYPE: DNA
<213> ORGANISM: Artificial Sequence
<220> FEATURE:
<223> OTHER INFORMATION: primer NS16

<400> SEQUENCE: 38
cctgttgtgc tgtttcgatt g                                                21

<210> SEQ ID NO 39
<211> LENGTH: 21
<212> TYPE: DNA
<213> ORGANISM: Artificial Sequence
<220> FEATURE:
<223> OTHER INFORMATION: primer 5'NS4

<400> SEQUENCE: 39
```

```
tcttgctctg acgccttatt c                                             21
```

<210> SEQ ID NO 40
<211> LENGTH: 22
<212> TYPE: DNA
<213> ORGANISM: Artificial Sequence
<220> FEATURE:
<223> OTHER INFORMATION: primer 3'NS4

<400> SEQUENCE: 40

```
atcgtcccaa gatccagaat gt                                            22
```